US012749360B1

(12) United States Patent
Morgan

(10) Patent No.: US 12,749,360 B1
(45) Date of Patent: Sep. 29, 2026

(54) AUTOMATED ROLLING DOOR SYSTEMS AND METHODS OF USE

(71) Applicant: Ascension Automation Solutions Ltd., Cambridge (CA)

(72) Inventor: Andrew Morgan, Guelph (CA)

(73) Assignee: Ascension Automation Solutions Ltd., Cambridge (CA)

( * ) Notice: Subject to any disclaimer, the term of this patent is extended or adjusted under 35 U.S.C. 154(b) by 0 days.

(21) Appl. No.: 19/267,384

(22) Filed: Jul. 11, 2025

(51) Int. Cl.
*G07C 9/00* (2020.01)
*G06V 40/16* (2022.01)
*G07C 9/25* (2020.01)

(52) U.S. Cl.
CPC ....... *G07C 9/00563* (2013.01); *G06V 40/172* (2022.01); *G07C 9/253* (2020.01)

(58) Field of Classification Search
CPC ...... G07C 9/00563; G07C 9/253; G07C 9/00; G06V 40/172; G06K 9/00; G06K 9/62; G06K 9/78; H04N 7/18; G01J 5/00
USPC ............................................ 340/5.2, 5.3, 5.7
See application file for complete search history.

(56) References Cited

U.S. PATENT DOCUMENTS 9,879,466 B1 * 1/2018 Yu ......................... H04W 4/023
10,861,265 B1 * 12/2020 Merkley ................ G06V 20/52
11,200,435 B1 * 12/2021 Scanlon ............... G05D 1/0094
11,594,086 B2 * 2/2023 Ehrlich .................. G07C 9/257
12,103,494 B2 * 10/2024 Van Wiemeersch .... B60R 25/25
2020/0349786 A1 * 11/2020 Ho ....................... G06V 40/172
2025/0095378 A1 * 3/2025 Ruelas .................. G06V 20/54

FOREIGN PATENT DOCUMENTS

IN 202411033859 A 5/2024
KR 20150112635 A 10/2015
KR 20210093571 A 7/2021

OTHER PUBLICATIONS

Promise Elechi Facial Recognition Based Smart Door Lock System May 2022Journal of Scientific & Industrial Research 6(2):95-105.

* cited by examiner

*Primary Examiner* — Nam V Nguyen
(74) *Attorney, Agent, or Firm* — CALDWELL LLC

(57) ABSTRACT

An automated rolling door system including a machine vision system including a camera, wherein the camera is configured to capture one or more images, a computing device configured to receive an initial image from the camera, identify an object of interest and a facial feature associated with the object of interest within the initial image, wherein the object of interest includes at least an industrial device, identify spatial data of the object of interest, compare the facial feature and the spatial data to a plurality of entry thresholds to generate an entry result, generate an entry command as a function of the entry result and transmit the entry command to an automated entry system and the automated entry system, wherein the automated entry system is configured to receive the entry command and initiate an entry response as a function of the entry command.

18 Claims, 8 Drawing Sheets

AUTOMATED ROLLING DOOR SYSTEMS AND METHODS OF USE

FIELD OF THE INVENTION

The present invention generally relates to the field of machine vision. In particular, the present invention is directed to automated rolling door systems and methods of use.

BACKGROUND

Facilities such as warehouses and factories face growing challenges related to safety, energy efficiency, and operational throughput. One persistent issue is the inefficiency and risk posed by conventional entry systems, especially in high-traffic areas where forklifts and other machinery frequently pass through. These traditional doors often lack intelligent access control, leading to unnecessary opening and closing, which compromises both safety and climate control. Misaligned or hurried entries can result in accidents or equipment damage, while open doors in temperature-sensitive zones contribute to significant energy losses. Additionally, security is often limited to manual oversight or basic keycard systems, which are susceptible to human error or unauthorized access.

SUMMARY OF THE DISCLOSURE

In an aspect an automated rolling door system is described. The automated rolling door system include a machine vision system including a camera, wherein the camera is configured to capture one or more images. The automated rolling door system further includes a computing device configured to receive an initial image from the camera, identify an object of interest and a facial feature associated with the object of interest within the initial image, wherein the object of interest includes at least an industrial device, identify spatial data of the object of interest, compare the facial feature and the spatial data to a plurality of entry thresholds to generate an entry result, generate an entry command as a function of the entry result and transmit the entry command to an automated entry system. The automated rolling door system further includes the automated entry system, wherein the automated entry system is configured to receive the entry command and initiate an entry response as a function of the entry command.

In another aspect a method of use for an automated rolling door system is described. the method includes receiving, by a computing device, an initial image from a machine vision system, wherein the machine vision system includes a camera configured to capture one or more images, identifying, by the computing device, an object of interest and a facial feature associated with the object of interest within the initial image, wherein the object of interest includes at least an industrial device, identifying, by the computing device, spatial data of the object of interest, comparing, by the computing device, the facial feature and the spatial data to a plurality of entry thresholds to generate an entry result, generating, by the computing device, an entry command as a function of the entry result and transmitting, by the computing device, the entry command to an automated entry system, wherein the automated entry system is configured to receive the entry command and initiate an entry response as a function of the entry command.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to automated rolling door systems and methods of use. In one or more embodiments, aspects of the present disclosure include a machine vision system including a camera, wherein the camera is configured to capture one or more images. Aspects of the present disclosure further include a computing device configured to receive an initial image from the camera, identify an object of interest and a facial feature associated with the object of interest within the initial image, wherein the object of interest includes at least an industrial device, identify spatial data of the object of interest, compare the facial feature and the spatial data to a plurality of entry thresholds to generate an entry result, generate an entry command as a function of the entry result and transmit the entry command to an automated entry system. Aspects of the present disclosure further includes the automated entry system, wherein the automated entry system is configured to receive the entry command and initiate an entry response as a function of the entry command.

Aspects of the present disclosure can be used to authenticate operators and/or industrial devices prior to allowing access into a facility. Aspects of the present disclosure can also be used to minimize heat loss between a facility and an external environment. This is so, at least in part, because of an automated rolling door system configured to grant access only in instances in which image classification verifies the presence of an industrial device and/or operator. Exemplary embodiments illustrating aspects of the present disclosure are described below in the context of several specific examples.

Figure 1:
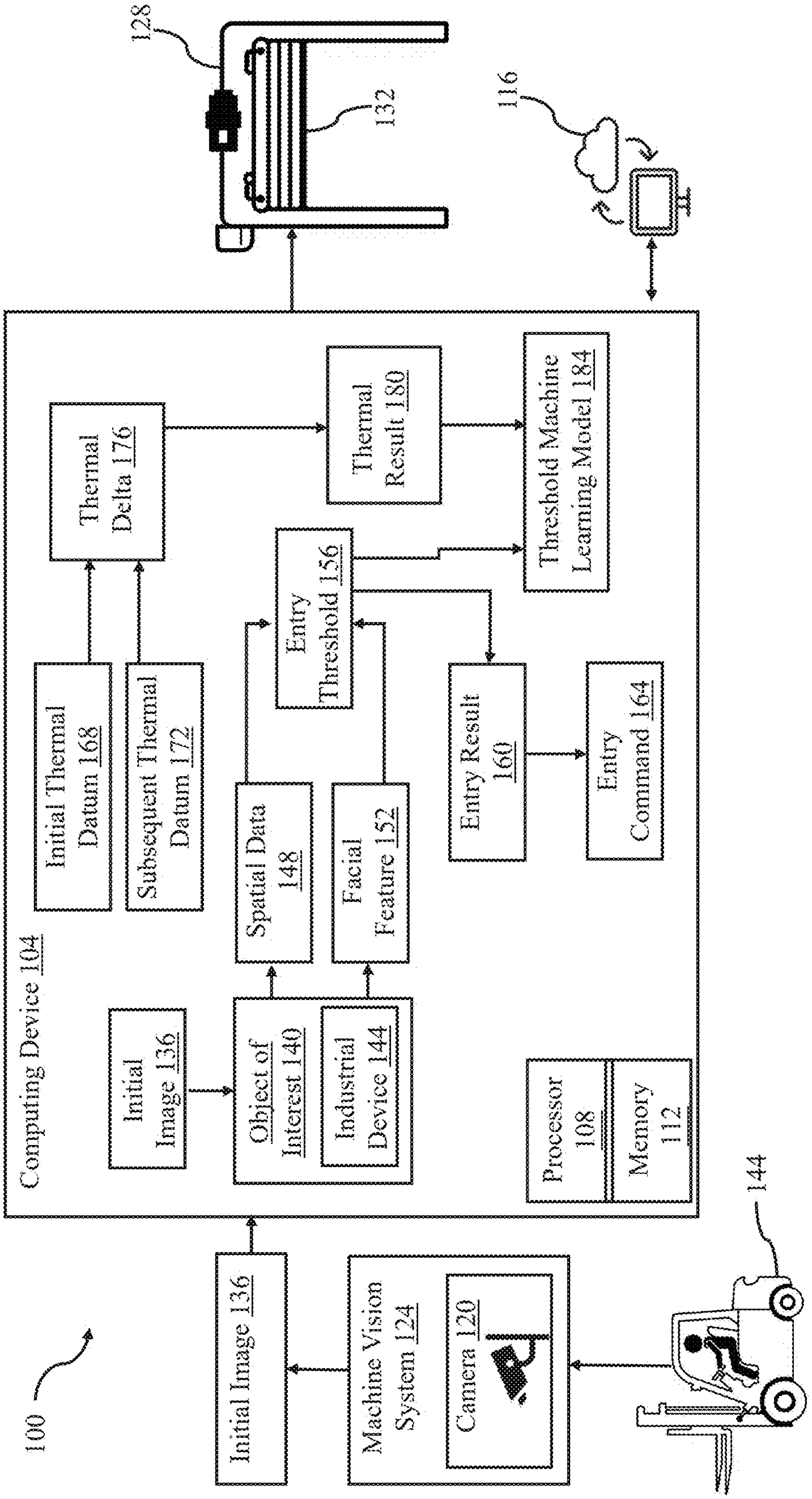
FIG. 1 is a block diagram illustrating an exemplary embodiment of an automated rolling door system.

With continued reference to FIG. 1, an automated rolling door system is described. Automated rolling door system may be referred to as 'system' or 'system 100' throughout this disclosure. In one or more embodiments, system 100 includes a computing device 104. System 100 includes a processor 108. Processor 108 may include, without limitation, any processor 108 described in this disclosure. Processor 108 may be included in a and/or consistent with computing device 104. In one or more embodiments, processor 108 may include a multi-core processor. In one or more embodiments, multi-core processor may include multiple processor cores and/or individual processing units. "Processing unit" for the purposes of this disclosure is a device that is capable of executing instructions and performing calculations for a computing device 104. In one or more embodiments, processing units may retrieve instructions from a memory, decode the data, secure functions and transmit the functions back to the memory. In one or more embodiments, processing units may include an arithmetic logic unit (ALU) wherein the ALU is responsible for carrying out arithmetic and logical operations. This may include, addition, subtraction, multiplication, comparing two data, contrasting two data and the like. In one or more embodiments, processing unit may include a control unit wherein the control unit manages execution of instructions such that they are performed in the correct order. In none or more embodiments, processing unit may include registers wherein the registers may be used for temporary storage of data such as inputs fed into the processor and/or outputs executed by the processor. In one or more embodiments, processing unit may include cache memory wherein memory may be retrieved from cache memory for retrieval of data. In one or more embodiments, processing unit may include a clock register wherein the clock register may be configured to synchronize the processor with other computing components. In one or more embodiments, processor 108 may include more than one processing unit having at least one or more arithmetic and logic units (ALUs) with hardware components that may perform arithmetic and logic operations. Processing units may further include registers to hold operands and results, as well as potentially "reservation station" queues of registers, registers to store interim results in multi-cycle operations, and an instruction unit/control circuit (including e.g. a finite state machine and/or multiplexor) that reads op codes from program instruction register banks and/or receives those op codes and enables registers/arithmetic and logic operators to read/output values. In one or more embodiments, processing unit may include a floating-point unit (FPU) wherein the FPU may be configured to handle arithmetic operations with floating point numbers. In one or more embodiments, processor 108 may include a plurality of processing units wherein each processing unit may be configured for a particular task and/or function. In one or more embodiments, each core within multi-core processor may function independently. In one or more embodiments, each core within multi-core processor may perform functions in parallel with other cores. In one or more embodiments, multi-core processor may allow for a dedicated core for each program and/or software running on a computing system. In one or more embodiments, multiple cores may be used for a singular function and/or multiple functions. In one or more embodiments, multi-core processor may allow for a computing system to perform differing functions in parallel. In one or more embodiments, processor 108 may include a plurality of multi-core processors. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently or may include two or more computing devices operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, system 100 includes a memory 112 communicatively connected to processor 108, wherein the memory 112 contains instructions configuring processor 108 to perform any processing steps as described herein. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of computing device 104, instructions and/or information may be transmitted to primary memory wherein information may be processed. In one or more embodiments, information may only be populated within primary memory while a particular software is running. In one or more embodiments, information within primary memory is wiped and/or removed after computing device 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 108 may access the information from primary memory.

Still referring to FIG. 1, system 100 may include a database 116. Database may include a remote database. Database 116 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database 116 may include a plurality of data entries and/or records as described above. Data entries in database may be flagged with or linked to one or more additional elements of information, which may be reflected in data entry cells and/or in linked tables such as tables related by one or more indices in a relational database. In one or more embodiments, database may include a remote database. A "remote database" as described in this disclosure is a is a database that is hosted on a server or computing system that is not located on the same physical machine as the client accessing it. Instead, it is accessed over a network, such as a local area network (LAN), a wide area network (WAN), or the internet. In one or more embodiments, computing device 104 may be communicatively connected to remote database, wherein computing device 104 may receive and/or transmit any data as described in this disclosure. Persons skilled in the art, upon reviewing the entirety of this disclosure, will be aware of various ways in which data entries in database may store, retrieve, organize, and/or reflect data and/or records.

With continued reference to FIG. 1, system 100 may include and/or be communicatively connected to a server, such as but not limited to, a remote server, a cloud server, a network server and the like. In one or more embodiments. In one or more embodiments, computing device 104 may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by system computing device. In one or more embodiments, computing device 104 may transmit processes to server wherein computing device 104 may conserve power or energy.

With continued reference to FIG. 1, system 100 includes a camera 120. As used in this disclosure, a "camera" is a device that is configured to sense electromagnetic radiation, such as without limitation visible light, and generate an image representing the electromagnetic radiation. In one or more embodiments, a camera 120 may include one or more optics. Exemplary non-limiting optics include spherical lenses, aspherical lenses, reflectors, polarizers, filters, windows, aperture stops, and the like. In one or more embodiments, at least a camera 120 may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In one or more embodiments, a camera 120 may be sensitive within a non-visible range of electromagnetic radiation, such as without limitation infrared. As used in this disclosure, "image data" is information representing at least a physical scene, space, and/or object. In one or more embodiments, image data may be generated by a camera 120. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively where "image" is used as a verb, in this disclosure, it refers to generation and/or formation of an image. In one or more embodiments, camera 120 may be configured to capture one or more images. In one or more embodiments, camera 120 may be configured to capture one or more images and/or videos of a scene, surrounding environment and/or the like. This will be described in further detail below.

With continued reference to FIG. 1, system 100 includes a machine vision system 124. In one or more embodiments, system 100 may include a machine vision system 124 that includes at least a camera 120. In one or more embodiments, machine vision system 124 may include and/or be included in computing device 104. In one or more embodiments, steps and/or processes of machine vision system 124 may be performed on computing device 104. A machine vision system 124 may use images from at least a camera 120, to make a determination about a scene, space, and/or object. For example, in one or more embodiments a machine vision system 124 may be used for world modeling or registration of objects within a space. In one or more embodiments, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In one or more embodiments, registration may include one or more transformations to orient a camera frame (or an image or video stream) relative a three-dimensional coordinate system; exemplary transformations include without limitation homography transforms and affine transforms. In one or more embodiments, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In one or more embodiments, x and y axes may be chosen to span a plane common to two cameras used for stereoscopic image capturing and/or an xy plane of a first frame; a result, x and y translational components and ¢ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In one or more embodiments, a machine vision system 124 may use a classifier, such as any classifier described throughout this disclosure.

With continued reference to FIG. 1, in one or more embodiments, camera 120 may include a range-imaging camera. An exemplary range-imaging camera that may be included in machine vision system 124 is Intel® RealSense™ D430 Module, from Intel® of Mountainview, California, U.S.A. D430 Module comprises active infrared (IR) illumination and a stereoscopic camera, having global shutters and frame rate of up to 90 fps. D430 Module provide a field of view (FOV) of 85.20 (horizontal) by 580 (vertical) and an image resolution of 1280×720. Range-sensing camera 120 may be operated independently by dedicated hardware, or, in one or more embodiments, range-sensing camera may be operated by a computing device 104. In one or more embodiments, range-sensing camera may include software and firmware resources (for execution on hardware, such as without limitation dedicated hardware or a computing device 104). D430 Module may be operating using software resources including Intel® RealSense™ SDK 2.0, which include opensource cross platform libraries.

With continued reference to FIG. 1, in one or more embodiments, camera 120 may include a machine vision camera. An exemplary machine vision camera that may be included in machine vision system 124 is an OpenMV Cam H7 from OpenMV, LLC of Atlanta, Georgia, U.S.A.

OpenMV Cam comprises a small, low power, microcontroller which allows execution of machine vision applications. OpenMV Cam comprises an ARM Cortex M7 processor 108 and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detection motion, for example by way of frame differencing algorithms; marker detection, for example blob detection; object detection, for example face detection; eye tracking; person detection, for example by way of a trained machine learning model; camera motion detection, for example by way of optical flow detection; code (barcode) detection and decoding; image capture; and video recording.

With continued reference to FIG. 1, camera may include a stereo camera. As used in this disclosure, a "stereo-camera" is a camera that senses two or more images from two or more vantages. As used in this disclosure, a "vantage" is a location of a camera relative a scene, space and/or object which the camera is configured to sense. In one or more embodiments, a stereo-camera may determine depth of an object in a scene as a function of parallax. As used in this disclosure, "parallax" is a difference in perceived location of a corresponding object in two or more images. An exemplary stereo-camera is TaraXL from e-con Systems, inc of San Jose, California. TaraXL is a USB 3.0 stereo-camera which is optimized for NVIDIA® Jetson AGX Xavier™/Jetson™ TX2 and NVIDIA GPU Cards. TaraXL's accelerated Software Development Kit (TaraXL SDK) is capable of doing high quality 3D depth mapping of WVGA at a rate of up to 60 frames per second. TaraXL is based on MT9V024 stereo sensor from ON Semiconductor. Additionally, TaraXL includes a global shutter, houses 6 inertial measurement units (IMUs), and allows mounting of optics by way of an S-mount lens holder. TaraXL may operate at depth ranges of about 50 cm to about 300 cm.

With continued reference to FIG. 1, system 100 and/or machine vision system 124 may include at least an eye sensor. As used in this disclosure, an "eye sensor" is any system or device that is configured or adapted to detect an eye parameter as a function of an eye phenomenon. In one or more embodiments, at least an eye sensor may be configured to detect at least an eye parameter as a function of at least an eye phenomenon. As used in this disclosure, an "eye parameter" is an element of information associated with an eye. Exemplary non-limiting eye parameters may include blink rate, eye-tracking parameters, pupil location, gaze directions, pupil dilation, and the like. Exemplary eye parameters are described in greater detail below. In one or more embodiments, an eye parameter may be transmitted or represented by an eye signal. An eye signal may include any signal described in this disclosure. As used in this disclosure, an "eye phenomenon" may include any observable phenomenon associated with an eye, including without limitation focusing, blinking, eye-movement, and the like. In one or more embodiments, at least an eye sensor may include an electromyography sensor. Electromyography sensor may be configured to detect at least an eye parameter as a function of at least an eye phenomenon.

Still referring to FIG. 1, in one or more embodiments, eye sensor may include an optical eye sensor. Optical eye sensor may be configured to detect at least an eye parameter as a function of at least an eye phenomenon. In one or more embodiments, an optical eye sensor may include a camera 120 directed toward one or both of person's eyes. In one or more embodiments, optical eye sensor may include a light source, likewise directed to person's eyes. Light source may have a non-visible wavelength, for instance infrared or near-infrared. In one or more embodiments, a wavelength may be selected which reflects at an eye's pupil (e.g., infrared). Light that selectively reflects at an eye's pupil may be detected, for instance by camera 120. Images of eyes may be captured by camera 120.

Still referring to FIG. 1, an exemplary camera is an OpenMV Cam H7 from OpenMV, LLC of Atlanta, Georgia, U.S.A. OpenMV Cam includes a small, low power, microcontroller which allows execution of processes. OpenMV Cam comprises an ARM Cortex M7 processor 108 and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detect motion, for example by way of frame differencing algorithms; detect markers, for example blob detection; detect objects, for example face detection; track eyes; detection persons, for example by way of a trained machine learning model; detect camera motion, for example by way of optical flow detection; detect and decode barcodes; capture images; and record video.

Still referring to FIG. 1, in one or more embodiments, a camera 120 may be used to determine eye patterns (e.g., track eye movements). For instance, camera 120 may capture images and processor 108 (internal or external) to camera 120 may process images to track eye movements. In one or more embodiments, a video-based eye tracker may use corneal reflection (e.g., first Purkinje image) and a center of pupil as features to track overtime. A more sensitive type of eye-tracker, a dual-Purkinje eye tracker, may use reflections from a front of cornea (i.e., first Purkinje image) and back of lens (i.e., fourth Purkinje image) as features to track. A still more sensitive method of tracking may include use of image features from inside eye, such as retinal blood vessels, and follow these features as the eye rotates. In one or more embodiments, optical methods, particularly those based on video recording, may be used for gaze-tracking and may be non-invasive and inexpensive. For instance, in one or more embodiments a relative position between camera 120 and person may be known or estimable. Pupil location may be determined through analysis of images (either visible or infrared images). In one or more embodiments, camera 120 may focus on one or both eyes and record eye movement as viewer looks. In one or more embodiments, eye-tracker may use center of pupil and infrared/near-infrared non-collimated light to create corneal reflections (CR). A vector between pupil center and corneal reflections can be used to compute a point of regard on surface (i.e., a gaze direction). In one or more embodiments, a simple calibration procedure with an individual person may be needed before using an optical eye tracker. In one or more embodiments, two general types of infrared/near-infrared (also known as active light) eye-tracking techniques can be used: bright-pupil (light reflected by pupil) and dark-pupil (light not reflected by pupil). Difference between bright-pupil and dark pupil images may be based on a location of illumination source with respect to optics. For instance, if illumination is coaxial with optical path, then eye may act as a retroreflector as the light reflects off retina creating a bright pupil effect similar to red eye. If illumination source is offset from optical path, then pupil may appear dark because reflection from retina is directed away from camera 120. In one or more embodiments, bright-pupil tracking creates greater iris/pupil contrast, allowing more robust eye-tracking with all iris pigmentation, and greatly reduces interference caused by eyelashes and other obscuring features. In one or more embodiments, bright-pupil tracking may also allow tracking in lighting conditions ranging from total darkness to very bright.

With continued reference to FIG. 1, system 100 includes an automated entry system 128. An "automated entry system" for the purposes of this disclosure is a device that uses control mechanisms and software to manage the opening and closing of doors, gates or any other barriers. In one or more embodiments, automated entry system 128 may be a combination of, control and actuation components designed to manage access without manual operation. In one or more embodiments, automated entry systems may include a controller or processor 108, which interprets information (such as commands) using predefined rules or intelligent algorithms to determine whether access should be granted. Based on this decision, automated entry system 128 may activate actuators, such as motors or hydraulic mechanisms, to open or close doors, gates, or barriers. In one or more embodiments, automated entry system 128 may include timing mechanisms to control how long an entry point remains open and communication interfaces for integration with systems such as system 100. In one or more embodiments, automated entry system 128 may include a door, a gate, and/or any other obstruction that prevents an individual or a vehicle from traversing through the automated entry system 128. In one or more embodiments, automated entry system 128 includes an automated passageway 132. An "automated passageway" for the purposes of this disclosure refers to a barrier that can open or close upon receipt of an electrical signal. In one or more embodiments, automated passageway 132 may include a door, a gate and/or any other barrier that may be opened or closed using mechanisms such as electrical motors, actuators and/or the like. In one or more embodiments, automated entry system 128 may include automated passageway 132, wherein automated entry system 128 may be configured to actuate automated passageway 132 such that an individual or vehicle may pass through. In one or more embodiments, automated passageway 132 may include a door to a facility, such as a factory, a door or barrier between two facilities, a door or barrier between two rooms, an entry way into a particular facility, a barrier for entry onto a particular property or geographical region and/or the like.

With continued reference to FIG. 1, automated entry system 128 and/or automated passageway 132 may include an actuator. An actuator may include a component of a machine that is responsible for moving and/or controlling a mechanism or system. An actuator may, in one or more embodiments, require a control signal and/or a source of energy or power. In one or more embodiments, a control signal may be relatively low energy. Exemplary control signal forms include electric potential or current, pneumatic pressure or flow, or hydraulic fluid pressure or flow, mechanical force/torque or velocity, or even human power. In one or more embodiments, an actuator may have an energy or power source other than control signal. This may include a main energy source, which may include for example electric power, hydraulic power, pneumatic power, mechanical power, and the like. In one or more embodiments, upon receiving a control signal, an actuator responds by converting source power into mechanical motion. In one or more embodiments, an actuator may be understood as a form of automation or automatic control.

With continued reference to FIG. 1, in one or more embodiments, actuator may include a hydraulic actuator. A hydraulic actuator may consist of a cylinder or fluid motor that uses hydraulic power to facilitate mechanical operation. Output of hydraulic actuator may include mechanical motion, such as without limitation linear, rotatory, or oscillatory motion. In one or more embodiments, hydraulic actuator may employ a liquid hydraulic fluid. As liquids, in one or more embodiments, are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In one or more embodiments, a hydraulic cylinder may be considered single acting. Single acting may be used when fluid pressure is applied substantially to just one side of a piston. Consequently, a single acting piston can move in only one direction. In one or more embodiments, a spring may be used to give a single acting piston a return stroke. In one or more embodiments, a hydraulic cylinder may be double acting. Double acting may be used when pressure is applied substantially on each side of a piston; any difference in resultant force between the two sides of the piston causes the piston to move.

With continued reference to FIG. 1, in one or more embodiments, actuator may include a pneumatic actuator. In one or more embodiments, a pneumatic actuator may enable considerable forces to be produced from relatively small changes in gas pressure. In one or more embodiments, a pneumatic actuator may respond more quickly than other types of actuators, for example hydraulic actuators. A pneumatic actuator may use compressible fluid (e.g., air). In one or more embodiments, a pneumatic actuator may operate on compressed air. Operation of hydraulic and/or pneumatic actuators may include control of one or more valves, circuits, fluid pumps, and/or fluid manifolds.

With continued reference to FIG. 1, in one or more embodiments, actuator may include an electric actuator. Electric actuator may include any of electromechanical actuators, linear motors, and the like. In one or more embodiments, actuator may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In one or more embodiments, control of an electromechanical actuator may include control of electric motor, for instance a control signal may control one or more electric motor parameters to control electromechanical actuator. Exemplary non-limitation electric motor parameters include rotational position, input torque, velocity, current, and potential. Electric actuator may include a linear motor. Linear motors may differ from electromechanical actuators, as power from linear motors is output directly as translational motion, rather than output as rotational motion and converted to translational motion. In one or more embodiments, a linear motor may cause lower friction losses than other devices. Linear motors may be further specified into at least 3 different categories, including flat linear motor, U-channel linear motors and tubular linear motors. Linear motors may be controlled be directly controlled by a control signal for controlling one or more linear motor parameters. Exemplary linear motor parameters include without limitation position, force, velocity, potential, and current.

With continued reference to FIG. 1, in one or more embodiments, an actuator may include a mechanical actuator. In one or more embodiments, a mechanical actuator may function to execute movement by converting one kind of motion, such as rotary motion, into another kind, such as linear motion. An exemplary mechanical actuator includes a rack and pinion. In one or more embodiments, a mechanical power source, such as a power take off may serve as power source for a mechanical actuator. Mechanical actuators may employ any number of mechanism, including for example without limitation gears, rails, pulleys, cables, linkages, and the like.

With continued reference to FIG. 1, automated entry system 128 may be communicatively connected to computing device 104. In one or more embodiments, automated entry system 128 may send and/or receive data to or from computing device 104. In one or more embodiments, computing device 104 may serve as a central controller that communicates with machine vision system 124 and automated entry system 128.

With continued reference to FIG. 1, automated entry system 128 may be configured to perform one or more actions upon receipt of a signal. As used in this disclosure, a "signal" is any intelligible representation of data, for example from one device to another. A signal may include an optical signal, a hydraulic signal, a pneumatic signal, a mechanical, signal, an electric signal, a digital signal, an analog signal and the like. In one or more embodiments, a signal may be used to communicate with a computing device 104, for example by way of one or more ports. In one or more embodiments, a signal may be transmitted and/or received by a computing device 104 for example by way of an input/output port. An analog signal may be digitized, for example by way of an analog to digital converter. In one or more embodiments, an analog signal may be processed, for example by way of any analog signal processing steps described in this disclosure, prior to digitization. In one or more embodiments, a digital signal may be used to communicate between two or more devices, including without limitation computing devices 104. In one or more embodiments, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols, and the like. In one or more embodiments, signal may include and/or be include in a command as described in further detail below. In one or more embodiments, signal may be used to transmit commands to automated entry system 128, wherein automated entry system 128 may be configured to perform an action as a result.

With continued reference to FIG. 1, computing device 104 is configured to receive an initial image 136 from camera 120. An "initial image" as described herein refers to a set of images that precede an additional set of images received from camera 120. In one or more embodiments, camera 120 may be configured to capture multiple sets of images, wherein a prior set of images may be referred to as initial images 136. In one or more embodiments, images received after initial image 136 may be referred to as "subsequent images" as described in this disclosure. In one or more embodiments, camera 120 may be configured to capture initial images 136. In one or more embodiments, initial images 136 may include images of a scene, images of a surrounding area of camera 120 and/or the like. In one or more embodiments, initial image 136 may include images of an industrial device 144. An "industrial device" as described in this disclosure refers to machinery designed and built for use in industrial environments. In one or more embodiments, industrial device 144 may be built and/or configured to perform specific tasks related to manufacturing, processing, material handling, automation, or control. In one or more embodiments, industrial devices may be engineered to withstand harsh conditions, such as dust, vibration, extreme temperatures, or continuous operation, and are often integrated into larger systems for production, logistics, or facility management. In one or more embodiments, industrial devices can range from simple tools like sensors and actuators to complex machinery like robotic arms, conveyor systems, or automated inspection units. In one or more embodiments, industrial device 144 may include but is not limited to, automated guided vehicles, autonomous mobile robots, robotic arms, conveyer systems, overheard cranes and/or the like. In one or more embodiments, industrial device 144 may include a motorized industrial vehicle. A "Motorized industrial vehicle" as described in this disclosure is a vehicle designed for use in industrial environments to transport, lift, tow, or move materials, goods, or equipment. In one or more embodiments, motorized industrial vehicle may include forklifts, powered pallet jacks, tow tractors, automated guided vehicles, industrial sweepers, motorized utility carts and/or the like. In one or more embodiments, motorized industrial vehicle may include a vehicle capable of transport through the use of electrical and/or gas-powered motors. In one or more embodiments, motorized industrial vehicles may be operated by an operator. An "operator" as described in this disclosure refers to an individual operating an industrial device 144. In one or more embodiments, operator may include an individual driving industrial vehicle. In one or more embodiments, operator may include an individual sitting inside of a forklift and guiding the forklift throughout a facility.

With continued reference to FIG. 1, in one or more embodiments, computing device 104 may be configured to iteratively receive initial images 136. In one or more embodiments, computing device 104 may use machine vision system 124 and/or any other image classification as described in this disclosure to identify industrial device 144. In one or more embodiments, computing device 104 may contain a list of industrial devices to identify, wherein computing device 104 and/or machine vision system 124 may be configured to identify industrial devices within images until an industrial device 144 is identified.

With continued reference to FIG. 1, computing device 104 and/or machine vision system 124 may be configured to classify initial images 136 using an image classifier. Computing device 104 may use an image classifier to classify images within any data described in this disclosure. An "image classifier," as used in this disclosure is a machine-learning model, such as a mathematical model, neural net, or program generated by a machine-learning algorithm known as a "classification algorithm," as described in further detail below, that sorts inputs of image information into categories or bins of data, outputting the categories or bins of data and/or labels associated therewith. Image classifier may be configured to output at least a datum that labels or otherwise identifies a set of images that are clustered together, found to be close under a distance metric as described below, or the like. Computing device 104 and/or another device may generate image classifier using a classification algorithm, defined as a process whereby computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. In one or more embodiments, processor 108 may use an image classifier to identify a key image in data described in any data described in this disclosure. An image classifier may be trained with binarized visual data that has already been classified to determine key images in any other data described in this disclosure. "Binarized visual data" for the purposes of this disclosure is visual data that is described in binary format. For example, binarized visual data of a photo may be comprised of ones and zeroes wherein the specific sequence of ones and zeros may be used to represent the photo. Binarized visual data may be used for image recognition wherein a specific sequence of ones and zeroes may indicate a product present in the image. An image classifier may be consistent with any classifier as discussed herein. In one or more embodiments, image classifier may include an/or be included within machine vision system 124. An image classifier may receive an input data described in this disclosure and output a key image with the data. As used herein, a "key image" is an element of visual data used to identify and/or match elements to each other. In one or more embodiments, image classifier may be used to compare visual data in data such as initial images 136, with visual data in another data set. Visual data in another data set may include a plurality of images of industrial devices located on database. In one or more embodiments, image classifier may identify one or more components within initial images 136, such as one or more industrial devices and/or one or more operators. In one or more embodiments, image classifier may identify a facial feature 152, a body of an individual and any other elements that may indicate that an individual is present within a particular frame within initial images 136. In one or more embodiments, image classifier may be used to determine the presence of one or more individuals within initial images 136. For example, image classifier may be used to determine the presence of one or more individuals within a given room of a facility. In the instance of a video captured by camera 120, processor 108 may be used to identify a similarity between videos by comparing them. Computing device 104 may be configured to identify a series of frames of video. The series of frames may include a group of pictures having some degree of internal similarity, such as a group of pictures having similar components, scenery, location and the like depicted within them or similar color profiles. In one or more embodiments, comparing series of frames may include video compression by inter-frame coding. The "inter" part of the term refers to the use of inter frame prediction. This kind of prediction tries to take advantage of temporal redundancy between neighboring frames enabling higher compression rates. Video data compression is the process of encoding information using fewer bits than the original representation. Any compression may be either lossy or lossless. Lossless compression reduces bits by identifying and eliminating statistical redundancy. No information is lost in lossless compression. Lossy compression reduces bits by removing unnecessary or less important information. Typically, a device that performs data compression is referred to as an encoder, and one that performs the reversal of the process (decompression) as a decoder. Data compression may be subject to a space-time complexity trade-off. For instance, a compression scheme for video may require expensive hardware for the video to be decompressed fast enough to be viewed as it is being decompressed, and the option to decompress the video in full before watching it may be inconvenient or require additional storage. Video data may be represented as a series of still image frames. Such data usually contains abundant amounts of spatial and temporal redundancy. Video compression algorithms attempt to reduce redundancy and store information more compactly. In one or more embodiments, image classifier may receive initial images 136, or any other data described in this disclosure and recognize key images within the data. In one or more embodiments, image classifier may identify an individual, a face, a location, a component, an object, an industrial device 144 or any other data described in this disclosure.

Continuing to reference FIG. 1, processor 108 may use a machine learning module, such as any machine learning module herein, to implement one or more algorithms or generate one or more machine-learning models, and calculate data as described herein. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from database, such as any database described in this disclosure, or be provided by a user. In other embodiments, a machine-learning module may obtain a training set by querying a communicatively connected database that includes past inputs and outputs. Training data may include inputs from various types of databases, resources, and/or user input and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Machine learning module may be used to generate a machine learning model and/or any other machine learning model using training data. Machine learning model may be trained by correlated inputs and outputs of training data. Training data may be data sets that have already been converted from raw data whether manually, by machine, or any other method. Training data may be stored in database. Training data may also be retrieved from database.

With continued reference to FIG. 1, processor 108 may classify data described in this disclosure using a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classifiers as described throughout this disclosure may be configured to output at least a datum that labels or otherwise identifies a set of data that are clustered together, found to be close under a distance metric as described below, or the like.

With continued reference to FIG. 1, processor 108 may be configured to generate classifiers as described throughout this disclosure using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm May include specifying a K-value, or a number directing the classifier to select the k most similar entries training data to a given sample, determining the most common classifier of the entries in the database 116, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process for the purposes of this disclosure. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculating the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors for the purposes of this disclosure may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, system 100 may include a machine vision system 124 configured to receive, process, and classify image data for the purpose of identifying physical objects, including industrial devices and/or individuals, within an operational environment. An "operational environment" as described in this disclosure refers to a location in a device, such as camera 120, is deployed and actively performs its intended tasks. In one or more embodiments, the image classifier may be generated using a classification algorithm, such as a supervised learning process, whereby the classifier is trained on a set of labeled image data representative of the target objects, such as industrial devices and/or operators. In one or more embodiments, the classifier is trained to identify visual instances of industrial equipment, such as forklifts, pallet trucks, tow tractors, autonomous mobile robots, conveyors, or other motorized or stationary machinery common in industrial facilities. Image classifier may additionally be configured to detect individuals within an image frame, including recognition of human anatomical features, clothing (e.g., high-visibility vests or safety helmets), or behavioral indicators associated with motion or interaction. In one or more embodiments, the machine vision system 124 and/or computing device 104 may receive initial images 136 from one or more sources, including but not limited to fixed or mobile cameras positioned within an industrial facility. In one or more embodiments, initial images 136 may be received from multiple cameras located at differing locations within an operational environments. In one or more embodiments, initial images 136 may include still images, sequences of video frames, or streaming data. In one or more embodiments, computing device 104 and/or machine vision system 124 may extract visual features from initial images 136, such as contours, color distributions, gradients, edge patterns, or keypoint descriptors, and pass such features to an image classifier for evaluation. In one or more embodiments, image classifier and/or machine visions system may output a set of classification labels corresponding to identified objects, along with associated metadata such as confidence scores, bounding boxes, timestamps, or spatial coordinates within the image. For example, image classifier may determine that an object within the image corresponds to a forklift with 94% confidence and generate a bounding box identifying its location within the frame. In one or more embodiments, machine vision system 124 and/or computing device 104 system identify multiple objects within a single image and associate each object with a unique classification. In one or more embodiments, computing device 104 and/or machine vision system 124 may further be configured to detect key images, defined herein as representative visual samples used to match or verify the presence of specific objects across different data instances. In one or more embodiments, image classifier may compare input image data (e.g., initial images 136) with a library of key images stored in memory, determining whether the visual structure of a detected object is sufficiently similar to a known reference using a similarity metric such as cosine similarity, Euclidean distance, or structural similarity index. In one or more embodiments, the image classifier may be applied to binarized visual data, wherein images are represented in binary format for improved computational efficiency. Image classifier may interpret such data by evaluating binary pixel arrangements that correspond to encoded visual signatures of industrial devices or individuals. In one or more embodiments, machine vision system 124 and/or computing device 104 may also perform a temporal analysis of visual data (e.g., initial images 136) by examining changes across video frames. Computing device 104 may group frames into clusters based on shared content or object presence, enabling object tracking and behavioral inference over time. Temporal analysis may incorporate frame differencing, optical flow, or inter-frame prediction techniques to detect object motion, entry, or exit from a designated area.

With continued reference to FIG. 1, computing device 104 is configured to identify an object of interest 140. An "object of interest" for the purposes of this disclosure refers to an object that meets a predefined criteria of relevance. For example, and without limitation object of interest 140 may include industrial device 144, wherein computing device 104 may be configured to identify industrial device 144 within initial images 136. In one or more embodiments, computing device 104 may be configured to iteratively receive images from camera 120 until object of interest 140 is identified in at least one image. The object of interest 140 may include, without limitation, industrial devices such as forklifts, automated guided vehicles, pallet jacks, conveyor mechanisms, or other equipment commonly deployed in manufacturing, warehouse, or logistics environments. In one or more embodiments, machine vision system 124 and/or image classifier may be trained to detect object of interest 140 within one or more frames of initial images 136. In one or more embodiments, image classifier may apply learned classification models to identify candidate regions in the image that match the visual signature of known object classes. In one or more embodiments, computing device 104 may be configured such that the detection of an object of interest 140 is a prerequisite for initiating further processing routines. For example, unless and until an object of interest 140 is identified within initial images 136, computing device 104 may suspend or withhold the execution of additional functions, such as access control actions, system logging, object tracking, generation of command and/or the like. In one or more embodiments, identification of object of interest 140 may include feature extraction, comparison against reference data, confidence scoring and/or the like. In one or more embodiments, if image classifier and/or machine vision system 124 determines that no object of interest 140 is present above a defined confidence threshold, the initial image 136 may be discarded or stored for later analysis, without triggering downstream modules. In one or more embodiments, another set of initial image 136 may then be received for identification of objects of interest. In one or more embodiments, this may occur continuously until object of interest 140 is identified. In one or more embodiments, once the presence of an object of interest 140 is confirmed, computing device 104 may further process initial image 136 for use in generating commands.

With continued reference to FIG. 1, computing device 104 is configured to identify a facial feature 152 within initial set of images. A "facial feature" as described in this disclosure refers to any distinguishable anatomical component or characteristic of a human face that can be visually identified and used for recognition, analysis, or classification. In one or more embodiments, computing device 104 may be configured to identify facial feature 152 within initial set of images. include facial or any other identifying features of an individual. The features may include boundaries of an individual's face, boundaries of an individual's body, colors, contrasts, shapes, and the like. In one or more embodiments, processor 108 may be configured to locate and detect one or more facial feature 152 of an individual or an operator within initial images 136 using an image classifier. In one or more embodiments, facial feature 152 may include the distance between two facial feature 152, such as the distance between two eyes, the distance between a nose and a mouth, the distance between a user's forehead and any other spatial relationships on a user's face or body. In one or more embodiments, an individual's facial feature 152 may be used to uniquely identify the individual. In one or more embodiments, each facial feature 152 may be unique and may be used to identify a particular individual. In one or more embodiments, processor 108 may be configured to perform feature extraction on one or more images within one or more initial images 136. "Feature extraction" for the purpose of this disclosure is the process of transforming an initial data set into informative measures and values. For example, feature extraction may include the process of determining one or more facial feature 152 such as determining a distance between two eyes, determining a distance of one segment of an individual's face to another segment and the like. In one or more embodiments, feature extraction may be used to determine one or more spatial relationships on an individual's face that may be used to uniquely identify the individual. For example, a particular identifier having a particular spatial distance between two eyes and a particular spatial distance between a chin and a nose may be used to identify a particular individual. In one or more embodiments, feature extraction may further include colors, intensities and border locations on an individual's face. In one or more embodiments, feature extraction may utilize edge detection as described above wherein edge detection may be used to determine the edges of a user's face. In one or more embodiments, processor 108 may be configured to extract regions of interest, wherein the regions of interest may be used to extract one or more features using one or more feature extraction techniques. In one or more embodiments, one or more identifiers located on database may be populated by an individual associated with the business or company. This may include but is not limited to, an employee, an agent working on behalf of the business and the like. In one or more embodiments, images of each individual within an entity may be uploaded wherein processor 108 may make one or more determinations of the images. Determinations may include feature extraction, image classification, and any other processor 108 described herein to determine one or more identifying features of an individual.

With continued reference to FIG. 1, computing device 104 may use machine vision system 124 and/or image classifier to identify facial feature 152 within an image. In one or more embodiments, computing device 104 may first identify object of interest 140 and then identify associated facial feature 152 with the object of interest 140. In one or more embodiments, associated facial feature 152 may include facial feature 152 of individuals operating an industrial device 144 that is associated with object of interest 140. In one or more embodiments, computing device 104 configured to identify individuals in proximity to machinery or directly operating such equipment. Using real-time image analysis, computing device 104 may detect and classify objects within camera's field of view, distinguishing between machinery (e.g., forklifts) and human operators based on shape, size, motion, and contextual cues. In one or more embodiments, computing device 104 may prioritize individuals located within predefined zones, such as the operator seat of a forklift or a safety perimeter near the machinery, by identifying body posture, hand placement, or orientation relative to the equipment. This may allow for computing device 104 to associate specific facial feature 152 with the individual operating or interacting with the machinery. In one or more embodiments, processor 108 may use region-based convolutional neural networks (R-CNNs), histogram of oriented gradients (HOG), or other deep learning-based object detection models to identify individual in proximity to object of interest 140 and/or to industrial device 144. These models may classify and localize human figures within an image frame, followed by a facial detection algorithm applied specifically to those regions. Once a potential operator is located, computing device 104 may perform detailed facial feature 152 extraction within the identified bounding box. This extraction may include detecting the positions of key facial landmarks (e.g., eyes, nose, mouth), computing distances between these landmarks, and analyzing symmetry, angles, and other geometric properties. These values may be matched against a stored profile to authenticate the individual. In one or more embodiments, computing device 104 may assign confidence scores to each detected face based on proximity to machinery, alignment with expected operator posture, or movement patterns consistent with equipment operation. The individual with the highest confidence score may be selected as the primary subject for further facial analysis. Additionally, temporal tracking may be used, allowing the system to analyze multiple frames over time to ensure that the person detected near the machinery is consistently present and engaged with the equipment. This may reduce a likelihood of misidentification due to transient bystanders or visual obstructions. To enhance accuracy, computing device 104 may also incorporate thermal imaging, depth sensing, or stereo vision to better differentiate between individuals and machinery, particularly in low-light or high-motion environments. Data from multiple sensors within a particular environment may be fused to create a composite image, improving detection reliability and allowing the processor 108 to more accurately isolate and identify the operator's facial feature 152. This combination of proximity detection, motion analysis, and facial feature 152 extraction ensures that only authorized individuals actively engaged with machinery can trigger or gain access through the automated entry system 128.

With continued reference to FIG. 1, computing device 104 may identify facial feature 152 and/or objects of interests within initial image 136 and/or initial images 136 as described above. In one or more embodiments, computing device 104 may be configured to identify spatial data 148 of industrial device 144 and/or object of interest 140. In one or more embodiments, object of interest 140 includes a particular industrial device 144 identified within initial image 136. In one or more embodiments, spatial data 148 may be identified and/or determined using initial image 136. "Spatial data" as described in this disclosure refers to information associated with a positioning of a device, for example, and without limitation, spatial data 148 may include the orientation of industrial device 144 (relative to a fixed point such as automated entry system 128), the location of industrial device 144 relative to a fixed point, the velocity of industrial device 144 and/or the like. In one or more embodiments, spatial data 148 may indicate that an object of interest 140, such as industrial device 144 may be orientated at an angle of 30 degrees relative to automated entry system 128 and/or automated passage way 132. In one or more embodiments, spatial data 148 may include a distance of industrial device 144 from automated entry system 128. In one or more embodiments, distance may be used to determine how far away industrial device 144 is from automated passageway 132.

With continued reference to FIG. 1, in one or more embodiments, identifying spatial data 148 may include identifying an orientation of industrial device 144 relative to automated entry system 128. In one or more embodiments, to determine spatial data 148 such as orientation, computing device 104 may use shape-based recognition models and/or keypoint detection to analyze the physical configuration of industrial device 144 as viewed within an image frame of initial image 136. For example, the relative position of the forklift's forks, wheels, or operator seat can be used to infer the angle or heading of the machine. Edge detection, contour mapping, and bounding box rotation metrics may be applied to estimate angular alignment with respect to a reference axis, such as the doorway plane. Ine or more embodiments, spatial data 148 may include a distance of industrial device 144 relative to automated entry system 128. In one or more embodiments, spatial data 148 such as velocity and/or direction of movement may be calculated using optical flow techniques, which track pixel-level displacement of the device across sequential image frames. These displacements can be converted into real-world movement estimates using frame rate data and known spatial calibration metrics of the camera 120 system. In one or more embodiments, motion vectors may be generated to indicate the magnitude and direction of the device's movement. Kalman filters or similar prediction models may also be employed to smooth noisy measurements and estimate the device's current and projected velocity. In one or more embodiments, spatial data 148 such as the distance between the industrial device 144 and the automated door system may be determined using monocular or stereo vision-based depth estimation. For example, computing device 104 may use known dimensions of the device and its size in initial image 136 to compute distance via scale-based inference. In other cases, stereo camera 120 setups or structured light sensors may be used to triangulate the 3D position of the machinery. Depth maps or disparity maps may be generated to assist in determining how far the device is from the door threshold or activation zone. In one or more embodiments, spatial data 148 associated with industrial device 144 may be combined with data from integrated sensors, such as inertial measurement units (IMUs), LiDAR, or wheel encoders. In one or more embodiments, computing device 104 may fuse data received from other sensors with visual information to enhance accuracy and reliability.

With continued reference to FIG. 1, spatial data 148 may include a wide range of positional and motion-related characteristics relevant to and/or associated with industrial device 144. In one or more embodiments, information may include acceleration, trajectory, angular displacement, turning radius, bounding volume, position relative to designated safety zones, proximity to personnel, and the time-to-arrival at a defined location (e.g., entry threshold 156). In one or more embodiments, spatial data 148 may further include information about the physical state of industrial device 144, such as whether it is stationary, reversing, rotating, or actively engaged in load-carrying operations based on posture and component configuration. In one or more embodiments, computing device 104 may calculate acceleration by analyzing the change in velocity over time using sequential image frames. By applying finite difference methods across position estimates derived from object tracking, computing device 104 can infer linear or angular acceleration values. For trajectory analysis, computing device 104 may track the movement path of the industrial device 144 across multiple frames using object tracking algorithms such as SORT (Simple Online and Realtime Tracking), DeepSORT, or recurrent neural networks (RNNs). These paths can then be compared to predefined routes or expected motion models to determine whether the device is following safe and intended travel paths. In one or more embodiments, turning radius and angular displacement may be computed by identifying rotational motion in the device's outline or reference points such as front and rear wheels. In one or more embodiments, computing device 104 may use affine transformations to detect changes in orientation and calculate the arc of movement. In one or more embodiments, bounding volume, referring to the three-dimensional space occupied by the device, can be estimated by combining object size in the image with known physical dimensions and perspective distortion models, allowing the system to determine spatial occupancy. In one or more embodiments, spatial data 148 may include a time to arrival estimation. In one or more embodiments, a time to arrival estimation may include an estimation of industrial device 144 reaching a location of automated entry system 128. In one or more embodiments, the time-to-arrival may be estimated by dividing the calculated distance from automated entry system 128 by the instantaneous velocity of industrial device 144.

With continued reference to FIG. 1, computing device 104 is configured to compare facial feature 152 and spatial data 148 to a plurality of entry thresholds 156. An "entry threshold" for the purposes of this disclosure refers a predefined set of parameters or conditions that must be satisfied in order for an action or event to occur. For example and without limitation, entry threshold 156 may indicate that only particular industrial devices are allowed entry into a given facility. Continuing, computing device 104 may identify object of interest 140 as a motorized pallet jack, whereas entry threshold 156 may indicate that only forklifts are allowed entry into a particular area. In one or more embodiments, entry thresholds 156 may include, but are not limited to, a particular orientation required for industrial device 144, a particular position required for industrial device 144 and/or the like. In one or more embodiments, entry thresholds 156 may include predetermined ranges and/or parameters for each type of data within spatial data 148. For example and without limitation, entry thresholds 156 may specify a required orientation, a required position and/or the like. In one or more embodiments, entry threshold 156 may include but is not limited to particular facial feature 152 that are required, authorized access to only certain individuals and/or the like. In one or more embodiments, entry thresholds 156 may include spatial conditions such as the distance between industrial device 144 and the automated entry system 128 being within a predefined range, correct orientation of the machinery (e.g., facing the door at an acceptable approach angle), and/or velocity being below a maximum threshold to prevent unsafe entries at high speed. In one or more embodiments, entry thresholds 156 may include time-based conditions, such as the machinery or individual maintaining alignment within the entry zone for a minimum duration before the door is actuated. In one or more embodiments, entry threshold 156 may include a successful match of facial feature 152 with a stored profile from an internal database, exceeding a minimum confidence score threshold determined by the facial recognition algorithm. In one or more embodiments, computing device 104 may also require that facial feature 152 be continuously detected and tracked for a specified number of frames or time window to confirm persistence and intentional presence, reducing the likelihood of accidental or false identification due to occlusion or brief appearances.

With continued reference to FIG. 1, computing device 104 may evaluate comparisons to entry threshold 156 parameters in real-time using data from one or more image classifiers, depth sensors, machine vision systems and/or the like. For example, if both spatial criteria (e.g., the forklift is aligned and within 1.5 meters of the entry point) and biometric criteria (e.g., the facial recognition confidence score exceeds 95%) are met, computing device 104 may generate commands for automation of automated entry system 128 to open. If one or more criteria are not satisfied, the task will be suspended, and the system may enter a monitoring state until all entry thresholds 156 are met following receipt of another set of initial images 136. In one or more embodiments, entry thresholds 156 may be dynamically adjustable based on contextual factors such as time of day, access level of the individual, environmental conditions (e.g., low light, heavy traffic), or operational policies set by the facility. For example, and without limitation, entry thresholds 156 may indicate that an operator with a particular clearance level may only enter during certain hours of the day.

With continued reference to FIG. 1, entry thresholds 156 may include parameters indicating individuals who are authorized to pass through automated entry system 128. In one or more embodiments, entry thresholds 156 may include a plurality of authorized facial profiles. An "authorized facial profile" as described in this disclosure refers to a stored digital representation of an individual's facial feature 152 that has been previously approved for recognition by system 100. In one or more embodiments, each authorized facial profile serves as a biometric identifier and is associated with a known, trusted individual who has been granted access privileges within a specific environment, such as an industrial facility, warehouse, or restricted entry zone. In one or more embodiments, authorized facial profile may include a set of extracted features derived from one or more reference images captured during an enrollment process. In one or more embodiments, an enrollment process may include an instance in which an operator is initially hired by an entity controlling facility. In one or more embodiments, an enrollment processor 108 may include an event prior to receipt of initial images 136 in which facial profiles of operators were captured and stored in database. In one or more embodiments, features within authorized facial profile may include spatial measurements, such as, but not limited to, distances between facial landmarks (e.g., eyes, nose, mouth), angles of facial structures, and the shape and contour of the face and/or the like. In one or more embodiments, authorized facial profile may include as well as textural details of an individual's face, skin tone, contrast gradients, and other distinguishing visual characteristics. In one or more embodiments, embodiments, these features may be transformed into a mathematical representation or embedding using machine learning models such as convolutional neural networks (CNNs).

With continued reference to FIG. 1, each authorized facial profile may be linked to metadata such as the individual's name, employee ID, role or access level, and other permissions relevant to the operation of the automated entry system 128. The authorized facial profiles may be stored in a database such as remote database, wherein authorized facial profiles may be retrieved and compared to newly captured facial images (e.g., facial feature 152) for identity verification. In one or more embodiments, only individuals with authorized facial profiles would be eligible to trigger events such as the opening of automated entry system 128. In one or more embodiments, computing device 104 may compare live facial inputs to the database of authorized facial profiles, wherein a positive match within a defined confidence threshold may constitute biometric authentication.

With continued reference to FIG. 1, computing device 104 may be configured to compare facial feature 152 to authorized facial profiles. Computing device 104 may be configured to compare captured facial feature 152 to authorized facial profiles through a multi-step biometric matching process involving feature extraction, encoding, similarity scoring, threshold-based evaluation and/or the like. In one or more embodiments, when a face is detected in a live image frame (e.g., initial image 136), computing device 104 may isolate the facial region using a detection model such as a convolutional neural network (CNN) or a histogram of oriented gradients (HOG) filter as described above. Computing device 104 may then perform feature extraction, identifying key landmarks such as the corners of the eyes, tip of the nose, mouth corners, jawline, and other anatomical reference points. These features may be mathematically quantified to capture the geometric and spatial relationships among them. In one or more embodiments, extracted features may be encoded into a fixed-length feature vector which serves as a compact numerical representation of the individual's face. This encoding may be performed using a pre-trained neural network such as FaceNet, DeepFace, or a facial recognition model optimized for industrial environments. The feature vector preserves distinctive facial information while normalizing against irrelevant variations such as lighting, facial expression, or minor head movements. Once the captured facial embedding is generated, computing device 104 may compare facial feature 152 to the authorized facial profiles stored in database. Each stored authorized facile profile may exist as a pre-computed feature. In one or more embodiments, computing device 104 may calculate a similarity score between the live embedding and each stored embedding using one or more distance metrics, such as Euclidean distance, cosine similarity, or Mahalanobis distance. The resulting similarity score may quantify how closely the captured features match a given authorized profile. If the score meets or exceeds a predefined match threshold, computing device 104 may determine that a biometric match has occurred. This threshold may be calibrated based on system requirements for accuracy and security. For example, a lower threshold may increase accessibility but allow for more false positives, whereas a higher threshold prioritizes security by minimizing mismatches. In cases where multiple individuals are present in a captured image, system may generate a separate facial result for each detected face and return one or more biometric matches based on highest confidence scores. Computing device 104 may also rank the results and flag them for secondary validation if needed.

With continued reference to FIG. 1, computing device 104 may compare facial feature 152 to authorized facial profiles to determine a facial result. A "facial result" as described in this disclosure refers to information associated with a degree of similarly between a captured facial feature 152 and one or more authorized facial profiles. For example, and without limitation, facial result may indicate that a match was found between a facial feature 152 and at least one authorized facial profile such that an individual or operator is identified as being one authorized to access automated entry system 128. In one or more embodiments, facial result may indicate a degree of similarity, such as a similarity score as described above, between facial feature 152 and one or more authorized facial profiles. In one or more embodiments, similarity scores may be compared to predefined thresholds to indicate whether a match is proper or not. In one or more embodiments, facial result may be used to identify a biometric march. In one or more embodiments, biometric match may be identified as a function of facial result. A "biometric match" as described in this disclosure is an indication as to whether a corresponding authorized facial profile has matched with a capture facial feature 152. For example and without limitation, biometric match may include information associated with an individual as to whom a match was found. In one or more embodiments, biometric match may include conclusion decision as to whether a facial feature 152 was properly matched to an authorized facial profile. For example, and without limitation, facial result may indicate an 80% degree of similarity between facial feature 152 and one authorized facial profile, wherein biometric match may include a final determination as to whether the facial feature 152 correctly matches with the authorized facial profile. In one or more embodiments, a predefine set of parameters may be used to identify biometric match. For example and without limitation, parameters may indicate that a degree of similarity higher than 75% may indicate a positive match, wherein biometric match may indicate a positive match in instances in which facial result contains an 85% degree of similarity. In one or more embodiments, biometric match may include information associated with the authorized facial profile which was deemed a positive match.

With continued reference to FIG. 1, in one or more embodiments industrial device 144 may include a unique identifier located on a surface of industrial device 144. A "unique identifier" as described in this disclosure refers to a distinct data element that can be used to individually distinguish between objects or devices. For example, and without limitation, each industrial device 144 may contain a unique alphanumeric sequence which can be used to distinguish one industrial device 144 from another. In one or more embodiments, unique identifier may include visual markers such as QR codes, color-coded tags, alphanumeric labels, RFID tags, NFC tags and/or the like. In one or more embodiments, each industrial device 144 may contain a unique identifier that may be visible to camera 120 and/or that is capable of being communicated to system 100. In one or more embodiments, computing device 104 may be configured to identify industrial device 144 by using initial image 136 or by receiving embedded digital identifiers transmitted from the industrial device 144 itself. In one or more embodiments, computing device 104 may analyze images obtained from a machine vision system 124 to detect and decode visual markers affixed to industrial device 144. These visual markers may include barcodes, QR codes, alphanumeric labels, or color-coded tags that are uniquely assigned to each industrial device 144. In one or more embodiments, computing device 104 may use image classification, pattern recognition, or optical character recognition (OCR) techniques to detect these unique identifiers within a captured image and extract their encoded information. In one or more embodiments, computing device 104 may apply a decoding algorithm to translate a visual pattern representative of a unique identifier, such as a QR code, into a string of characters or a device identifier. This identifier may then be matched to a database of known equipment records, enabling the system to recognize the specific industrial device 144 and associate it with relevant operational data, such as ownership, access level, or recent activity. In one or more embodiments, computing device 104 may also be configured to validate the authenticity or formatting of the visual marker before making an identification determination. In one or more embodiments, computing device 104 may identify an industrial device 144 by receiving one or more embedded digital identifiers transmitted wirelessly. These may include data from RFID (Radio-Frequency Identification) tags or NFC (Near-Field Communication) tags that are attached to or integrated into the device. As the industrial device 144 approaches an area monitored by the camera 120, the embedded identifier may be transmitted to the computing device 104 using a compatible reader. Upon receipt computing device 104 may compare the digital identifier to a stored database of authorized or known devices. The identification process may include verifying that the received identifier corresponds to a valid entry, checking for expiration or usage restrictions, and optionally associating the identifier with facial recognition data from nearby individuals to ensure matched operator-device pairings. In one or more embodiments, computing device 104 may receive unique identifier through initial image 136 and/or through communication from industrial device 144. In one or more embodiments, computing device 104 may be configured to compare unique identifier to a plurality of authorized unique identifiers. An "authorized unique identifier" as described in this disclosure refers to a unique identifier that has been previously verified or recorded by system 100. In one or more embodiments, database may include a plurality of unique identifiers. In one or more embodiments, computing device 104 may be configured to compare unique identifier to a plurality of authorized unique identifiers. In one or more embodiments, entry thresholds 156 may include authorized unique identifiers. In one or more embodiments, computing device 104 may identify unique identifier on industrial device 144 and compare unique identifier to one or more authorized unique identifiers. In one or more embodiments, a positive match may indicate to computing device 104 that a particular industrial device 144 contains the requisite credentials for entry. In one or more embodiments, unique identifiers may be located on a surface of industrial device 144, such as front, a roof and/or the like.

With continued reference to FIG. 1, computing device 104 is configured to generate an entry result 160 based on the comparison of the facial feature 152 and spatial data 148 to the plurality of entry thresholds 156. An "entry result" as described in this disclosure refers to information indicating whether the detected facial feature 152 and spatial data 148 meet one or more entry thresholds 156. In one or more embodiments, entry result 160 may indicate that facial feature 152 contains at least one positive match with a facial feature 152 profile. In one or more embodiments, entry result 160 may indicate that spatial data 148 such as orientation has at least one positive match. In one or more embodiments, entry result 160 may include information indicating whether one or more entry thresholds 156 have been met such that an operator and industrial device 144 can be granted entry through automated entry system 128. In one or more embodiments, system 100 may only require that one or more entry thresholds 156 of a plurality of entry thresholds 156 be satisfied for entry through automated entry system 128.

With continued reference to FIG. 1, computing device 104 is configured to generate an entry command 164 as a function of the entry result 160. An "entry command" as described in this disclosure refers to an instruction for automated entry system 128 to perform one or more actions. For example and without limitation, entry command 164 may include instructions to allow entry through automated entry system 128. In one or more embodiments, entry command 164 may include instructions to automated entry system 128 to open up automated passageway 132 to allow for operator and/or industrial device 144 to pass through. In one or more embodiments, entry command 164 may include instructions for automated entry system 128 to trigger an alarm, to close a passageway and/or the like. In one or more embodiments, entry command 164 may include instructions for an actuation of an automated entry system 128, such as opening a rolling door, granting access to a restricted area, or enabling the operation of nearby machinery. In one or more embodiments, if the computed result indicates non-compliance with the entry thresholds 156, such as an unrecognized individual, an unauthorized device, or improper alignment, entry command 164 may include instructions triggering an alarm, sending a security notification, logging an access denial event, activating a visual or auditory warning signal, disabling the entry mechanism entirely and/or the like.

With continued reference to FIG. 1, entry commands may include timing parameters. A "timing parameter" as described in this disclosure refers to timing constraints associated with an entry command 164. For example, and without limitation, timing parameter may include predefined duration, interval, or temporal condition that governs when, how long, or under what timing constraints an entry command 164 may be executed by computing device 104. In one or more embodiments, timing constraint may indicate a specified amount of time that must pass after the system detects a valid entry condition before the entry command 164 is executed (e.g., a 2-second delay before a door opens after facial recognition). In one or more embodiments, timing parameter may include a defined time period during which the entry command 164 remains valid or active (e.g., the rolling door remains open for 10 seconds before closing automatically). In one or more embodiments, timing parameter may include a maximum time limit within which required criteria (such as facial recognition or spatial alignment) must be met. If the criteria are not satisfied within this time, the computing device 104 may cancel the pending entry command 164 or initiates a failure response, such as an alert. In one or more embodiments, timing parameter may indicate how long an automated passageway 132 should be left open prior to closing. In one or more embodiments, automated entry system 128 may be used to ensure heat loss is minimized between a facility and an outside environment. In one or more embodiments, timing parameter may indicate that amount of time that automated passageway 132 is left open in order to minimize heat loss.

With continued reference to FIG. 1, a plurality of entry commands may be located and/or stored on database. In one or more embodiments, a list of entry commands may be stored on database, wherein computing device 104 may select entry commands most suitable based on entry result 160, spatial data 148, facial feature 152 and/or the like. For example, and without limitation, computing device 104 may select an entry command 164 having a timing parameter indicating a longer time frame in which automated passageway 132 is left open in instances in which industrial device 144 is identified to be a larger vehicle. In one or more embodiments, entry commands may be selected based on the identified industrial device 144, the speed of industrial device 144 and/or the like. In one or more embodiments, generation of an entry command 164 may depend on one or more factors, including identification results, spatial positioning, set of timing parameters and/or the like. These timing parameters may be dynamically determined by the computing device 104 based on real-time analysis of contextual data such as the speed, size, and orientation of the approaching industrial device 144 or equipment. In one or more embodiments, computing device 104 may determine the speed of an industrial vehicle by analyzing sequential image frames captured from a vision system. By calculating the change in position of the device over time, computing device 104 may estimate the velocity and adjust the timing of the entry command 164 accordingly. For example, faster-moving vehicles may require earlier initiation of an entry command 164 to allow sufficient time for the entryway to fully open before arrival. Conversely, slower speeds may allow for delayed actuation to conserve energy or reduce unnecessary door cycling. In one or more embodiments, the size of the industrial device 144 may also influence generation of entry command 164. In one or more embodiments, larger vehicles may require wider or longer-duration openings, while smaller devices may permit shorter access windows. In one or more embodiments, computing device 104 may store predefined mappings between device size classes and corresponding entry command 164 durations in a database or may calculate them in real time using dimensional analysis. In one or more embodiments, a plurality of entry commands may be stored in a database, each associated with specific combinations of identifier types, vehicle classes, user roles, and spatial conditions. In one or more embodiments, when computing device 104 identifies an approaching vehicle or individual, computing device 104 may retrieve the corresponding entry command 164 from the database and execute it if all relevant entry thresholds 156 are met. Each entry command 164 may include metadata such as timing parameters defining door open time, delay period, associated alarms, or lighting signals.

With continued reference to FIG. 1, computing device 104 may use linear equations to compute entry command 164 parameters based on input variables such as distance to entry, speed, size, and orientation of the device. For instance, the duration of a door opening could be calculated using the equation: Entry Duration=(Device Length/Speed)+Buffer Time, where buffer time accounts for system latency or safety margins. In one or more embodiments, computing device 104 may utilize one or more machine learning models, such as regression models, decision trees, or neural networks to predict optimal entry commands based on historical and real-time data. In one or more embodiments, the models may be consistent with any machine learning model as described in this disclosure and may be trained on data that includes previous access events, environmental conditions, operator behavior, and equipment specifications. The machine learning model may receive as input one or more features such as facial recognition confidence scores, spatial alignment metrics, and device telemetry, and output an entry command 164 type, timing configuration, or risk classification. In one or more embodiments, computing device 104 may also continuously learn from feedback, adapting command-generation logic over time to improve efficiency, reduce false access triggers, and optimize workflow performance across varying industrial conditions.

With continued reference to FIG. 1, computing device 104 is configured to transmit entry command 164 to automated entry system 128. In one or more embodiments, entry command 164 may be transmitted as a signal, such as any signal as described in this disclosure. In one or more embodiments, transmitting entry command 164 to automated entry system 128 may include appending a central log with data derived from the spatial analysis and facial recognition processes. A "central log" as described in this disclosure refers to a digital record that documents events, operational parameters, or any other information associated with the generation of entry commands. In one or more embodiments, the central log may function as a comprehensive historical ledger that captures input data, system evaluations, command outputs, contextual information and/or the like related to facial recognition, spatial data 148, unique identifier processing, and entry command 164 execution. In one or more embodiments, the computing device 104 may create an entry in central log each time an object of interest 140 is identified, a facial identification is evaluated, or an entry command 164 is generated. The central log may include but is not limited to a timestamp indicating the precise time of identification of object of interest 140, a facial identification result including user ID, biometric feature vectors, match confidence score, a unique identifier corresponding to an industrial device 144, spatial data 148 such as the detected orientation, velocity, or distance of the industrial device 144 from the entry system and/or the like. In one or more embodiments, central log may further include an entry threshold 156 status, indicating whether the required facial and spatial parameters were satisfied and a record of the entry command 164 issued by the computing device 104. The data appended to central log may include the type of entry command 164 (e.g., door open, delay, alarm trigger), the timing parameters used (e.g., execution window, buffer time, timeout period), and the system's determination (e.g., access granted, denied, or escalated).

With continued reference to FIG. 1, in one or more embodiments, computing device 104 may append to the central log the output of one or more computational models used during the decision-making process. This may include results derived from linear equations, such as calculations involving size and speed of the industrial device 144, or predictions generated by machine learning models, such as neural networks trained on historical access data. Input features used by the model and selected command profiles may also be stored in the central log for traceability and performance analysis. In one or more embodiments, the central log may also record environmental data, such as lighting conditions, presence of multiple individuals, or any system alerts or failures encountered during the access attempt. In one or more embodiments, data may be transmitted in real time or at scheduled intervals to the remote database for centralized monitoring, audit compliance, operational analytics, or use in feedback loops for adaptive system tuning. In one or more embodiments, central log may be stored and/or located on database or remote database. In one or more embodiments, data may be iteratively appended to central log following generation of each entry command 164. The central log may be stored on a remote database accessible by authorized systems or personnel and may serve as a historical record for audit, compliance, safety, and performance optimization purposes. In one or more embodiments, computing device 104 may compile one or more log entries at the time of entry command 164 generation, each entry including metadata such as the time of access, the identity of the individual determined through facial feature 152 matching, the identified industrial device 144 via unique identifier or visual marker, and the entry threshold 156 parameters that were met or unmet. Spatial data appended to the log may include the orientation, velocity, distance, and positional coordinates of the industrial device 144 relative to the entry system at the time of evaluation. Facial data may include identifiers such as a matched user ID, confidence score of the biometric match, and time stamps associated with the facial feature 152 detection. In one or more embodiments, central log may further include the specific entry command 164 issued, such as door opening duration, delay period, or alarm activation, and any timing parameters calculated in real time based on the size or speed of the approaching device.

With continued reference to FIG. 1, in one or more embodiments, automated entry system 128 is configured to receive entry command 164 and initiate an entry response as a function of the entry command 164. An "entry response" as described in this disclosure is an action performed by automated entry system 128 in response to a receipt of an entry command 164. For example, and without limitation, entry response may include actuation of automated passageway 132. In one or more embodiments, entry response may include actuation of one or more actuators and/or motors associated with automated entry system 128, execution of an audible alarm, execution of a visible alarm such as light and/or the like. In one or more embodiments, entry response may further include the opening or closing of automated passageway 132. In one or more embodiments, entry response may include transmission of entry command 164 to a central log. In one or more embodiments, entry response may include notification to a remote device, such as a smartphone or mobile computing device 104 that entry response has been generated. In one or more embodiments, entry response may include notification to a remote device that access has been granted or denied. In one or more embodiments, entry response may include a notification transmitted to a remote device indicating whether access has been granted or denied. In one or more embodiments, entry response may further include the closing of automated passageway 132. In one or more embodiments, timing parameters may be used to indicate the duration of entry response, wherein for example, a timing parameter of 30 seconds may result in an automated passageway 132 being open for 30 seconds. In one or more embodiments, entry response may be communicated to computing device 104. In one or more embodiments, computing device 104 may receive information indicating whether a particular entry command 164 was executed in the form of entry response and/or whether a failure has occurred. In one or more embodiments, entry response may include information indicating that an automated passageway 132 has failed to open, failed to close, is jammed and/or the like.

With continued reference to FIG. 1, computing device 104 may be configured to iteratively and/or continuously modify and/or update entry thresholds 156 based on entry responses, generated entry commands and/or any other information as described in this disclosure. In one or more embodiments, computing device 104 may be configured to perform image classification on one or more images containing partially obstructed facial feature that are insufficient for definitive identification of an individual through conventional facial recognition techniques. In such cases, computing device 104 may utilize a trained image classifier to detect other distinguishing visual attributes associated with the individual that is located within images captured by camera 120. For example, and without limitation, an image classifier may be configured to identify the presence of a uniform, name tag, badge, helmet decal and/or other unique accessories or markings worn or carried by the individual. In one or more embodiments, features may be used as proxy identifiers when direct biometric recognition is impaired due to occlusion, poor lighting, or image quality. In one or more embodiments, computing device 104 may be configured to identify components within images that are specific and/or unique to each individual. For example, and without limitation, computing device 104 may be configured to identify name tags, unique codes, uniforms and/or the like. In one or more embodiments, computing device 104 may analyze the partially obstructed image and extract non-facial feature 152 using feature extraction techniques, such as edge detection, color segmentation, or pattern recognition. These features may be classified using a supervised or semi-supervised machine learning algorithm. The computing device 104 may then associate the identified non-facial feature 152 with a known individual by correlating them with metadata from prior fully identified instances, where both facial feature 152 and other distinguishing characteristics were concurrently present and verifiably matched to an authorized facial profile. In one or more embodiments, computing device 104 may use key identified features to correlate partially obstructed facial feature to various individuals. In one or more embodiments, key features within images may be used for self-training of a machine learning model, wherein key features may be used to associate partially obstructed facial feature to individuals.

With continued reference to FIG. 1, computing device 104 may compile a training dataset containing a plurality of partially obstructed facial feature wherein indirect or partial identifiers have been successfully correlated to a specific user through historical facial matches. This training data may be used to train or fine-tune a machine learning model, such as a convolutional neural network (CNN) or transformer-based image classification model, to recognize the individual based on these auxiliary features. The model may be incrementally updated using a self-supervised learning approach, wherein the system autonomously labels and stores new feature associations as they are verified by the presence of authorized facial profile matches in other contexts. In one or more embodiments, as the machine learning model improves, computing device 104 may achieve greater accuracy in recognizing individuals even when facial data is only partially visible or missing. This will allow the comparison process to become more efficient in future iterations by reducing the dependency on complete facial feature 152 sets for identification. In one or more embodiments, computing device 104 may perform a multi-feature comparison, weighting both partial facial feature 152 and auxiliary identifiers, to determine a confidence score of identity matching to one or more authorized facial profiles on the database. In subsequent access attempts, this capability may enhance the system's ability to determine whether a user meets the facial feature 152-related entry threshold 156, even in the presence of obstructions or variability in facial visibility.

With continued reference to FIG. 1, computing device 104 may be configured to modify and/or iteratively entry thresholds 156, entry commands and/or the like. In one or more embodiments, upon transmission of entry commands, Computing device 104 may be configured to receive data from automated entry system 128 and/or other devices in communication with computing device 104. In one or more embodiments, such data may be used to determine the effectiveness of entry commands, the efficiency of entry commands and/or the like. In one or more embodiments, data may indicate that an entry command 164 resulted in a door opening too quickly, too slowly and/or the like. In one or more embodiments, data may indicate that response time may need to be increased, entry thresholds 156 may need to be modified and/or the like. For example, and without limitation, data may indicate that the particular orientation of a vehicle required to traverse through automated entry system 128 results in a higher percentage of accidents and/or results in longer times associated with traversing through automate entry system. In one or more embodiments, computing device 104 may be configured to modify entry thresholds 156 to ensure that vehicles are properly aligned prior to actuation of automated passageway 132. In one or more embodiments, computing device 104 may be configured to modify entry commands to ensure that automated passageways 132 are not open for too short of a period of time and/or too long of a period of time.

With continued reference to FIG. 1, computing device 104 may be communicatively connected to one or more sensors. In one or more embodiments, sensor may include one or more sensors. As used in this disclosure, a "sensor" is a device that is configured to detect an input and/or a phenomenon and transmit information related to the detection. For example, and without limitation, a sensor may transduce a detected charging phenomenon and/or characteristic, such as, and without limitation, temperature, voltage, current, pressure, and the like, into a sensed signal such as a voltage with respect to a reference. Sensor may detect a plurality of data. A plurality of data detected by sensor may include, but is not limited to temperature, humidity levels, motion and/or the like. In one or more embodiments, and without limitation, sensor may include a plurality of sensors.

With continued reference to FIG. 1, sensor may include a plurality of independent sensors, where any number of the described sensors may be used to detect any number of physical or thermal quantities associated with a surrounding environment of automated entry system 128. Independent sensors may include separate sensors measuring physical or thermal quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor to detect phenomenon may be maintained.

Still referring to FIG. 1, sensor may include a motion sensor. A "motion sensor," for the purposes of this disclosure, refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor may include, torque sensor, gyroscope, accelerometer, torque sensor, magnetometer, inertial measurement unit (IMU), pressure sensor, force sensor, proximity sensor, displacement sensor, vibration sensor, among others.

With continued reference to FIG. 1, sensor may include a moisture sensor. "Moisture," as used in this disclosure, is the presence of water, which may include vaporized water in air, condensation on the surfaces of objects, or concentrations of liquid water. Moisture may include humidity. "Humidity," as used in this disclosure, is the property of a gaseous medium (almost always air) to hold water in the form of vapor. In an embodiment, a moisture sensor may include a hygrometer. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity," for the purposes of this disclosure, is expressed as a percentage, indicating a present stat of absolute humidity relative to a maximum humidity given the same temperature. "Specific humidity," for the purposes of this disclosure, is the ratio of water vapor mass to total moist air parcel mass, where parcel is a given portion of a gaseous medium. Humidity sensor may be psychrometer. Humidity sensor may be a hygrometer. Humidity sensor may be configured to act as or include a humidistat. A "humidistat," for the purposes of this disclosure, is a humidity-triggered switch, often used to control another electronic device. Humidity sensor may use capacitance to measure relative humidity and include in itself, or as an external component, include a device to convert relative humidity measurements to absolute humidity measurements.

With continued reference to FIG. 1, sensor may include thermocouples, thermistors, thermometers, infrared sensors, resistance temperature detectors (RTDs), semiconductor based integrated circuits (ICs), a combination thereof, or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor, may be measured in Fahrenheit (° F.), Celsius (° C.), kelvin (K), Rankine (° R), or another scale alone or in combination. The temperature measured by sensors may comprise electrical signals, which are transmitted to their appropriate destination wireless or through a wired connection.

With continued reference to FIG. 1, sensor may include a plurality of sensing devices, such as, but not limited to, temperature sensors, humidity sensors, accelerometers, electrochemical sensors, gyroscopes, magnetometers, inertial measurement unit (IMU), pressure sensor, proximity sensor, displacement sensor, force sensor, vibration sensor, air detectors, hydrogen gas detectors, and the like. Sensor may be configured to detect a plurality of data, as discussed further below in this disclosure. A plurality of data may be detected from sensor.

With continued reference to FIG. 1, sensor may include a sensor suite which may include a plurality of sensors that may detect similar or unique phenomena. For example, in a non-limiting embodiment, a sensor suite may include a plurality of voltmeters or a mixture of voltmeters and thermocouples. System 100 may include a plurality of sensors in the form of individual sensors or a sensor suite working in tandem or individually. A sensor suite may include a plurality of independent sensors, as described in this disclosure, where any number of the described sensors may be used to detect any number of physical or electrical quantities associated with a charging connection. Independent sensors may include separate sensors measuring physical or electrical quantities that may be powered by and/or in communication with circuits independently, where each may signal sensor output to a control circuit. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained.

With continued reference to FIG. 1, sensor is configured to transmit a sensor output signal representative of sensed information. As used in this disclosure, a "sensor signal" is a representation of a sensed information that sensor may generate. A sensor signal may include any signal form described in this disclosure, for example digital, analog, optical, electrical, fluidic, and the like. In some cases, a sensor, a circuit, and/or a controller may perform one or more signal processing steps on a signal. For instance, sensor, circuit, and/or controller may analyze, modify, and/or synthesize a signal in order to improve the signal, for instance by improving transmission, storage efficiency, or signal to noise ratio.

With continued reference to FIG. 1, exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device 104 or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, computing device 104 may be communicatively connected to one or more thermal sensors. In one or more embodiments, thermal sensors may be used to measure a temperature of a surrounding environment of industrial device 144. In one or more embodiments, thermal sensors may be situated on both sides of automated entry system 128. For example, and without limitation, a first thermal sensor may be located within a facility, a second thermal sensor may be located outside of a facility, wherein automate entry system may allow for entrance into a facility. In one or more embodiments, one or more thermal sensors may exist in order to detect a temperature between both sides fo automated entry system 128. In one or more embodiments, a signal thermal sensor may exist within a facility that is closed to an outside environment. This may include but is not limited to, a structure with walls, roofs and/or the like that is partially and/or wholly insulated from an external environment. In one or more embodiments, thermal sensors may be used to monitor a temperature of an internal environment within a facility. In one or more embodiments, thermal sensors may be used to ensure that a temperature within a facility such as a factory and/or warehouse is contained at a particular temperature.

With continued reference to FIG. 1, computing device 104 may receive a thermal datum. In one or more embodiments, computing device 104 may receive a thermal datum from a thermal sensors, another computing device 104 and/or the like. A "thermal datum" as described in this disclosure is information associated with a temperature of a predetermined area. In one or more embodiments, thermal datum may include the temperature of a warehouse, a facility, a surrounding environment of industrial device 144 and/or the like. In one or more embodiments, thermal datum may be received in the form of degrees Celsius, Fahrenheit, kelvin and/or the like. In one or more embodiments, computing device 104 may be configured to receive multiple thermal datums, such as an initial thermal datum 168 and a subsequent thermal datum 172. In one or more embodiments, an initial thermal datum 168 may include a thermal datum received prior to another thermal datum, such as for example, a subsequent thermal datum 172. In one or more embodiments, computing device 104 may be configured to receive initial thermal datum 168 prior to actuation of automated passageway 132 and/or automated entry system 128. In one or more embodiments, computing device 104 may be configured to receive initial thermal datum 168 captured immediately prior to transmission and/or generation of entry command 164 and/or prior to initiation of entry response. In one or more embodiments, computing device 104 may then be configured to receive subsequent thermal datum 172 following generation of entry command 164. In one or more embodiments, computing device 104 may receive subsequent thermal datum 172 following initiation of entry response, following an opening of automated passageway 132, following a closing of automated passageway 132 and/or the like. In one or more embodiments, receipt of initial thermal datum 168 and subsequent thermal datum 172 may allow for computing device 104 to identify changes in temperature after automated entry system 128 allows access for an industrial device 144 to pass through. In one or more embodiments, initial thermal datum 168 and subsequent thermal datum 172 may be used to calculate a thermal delta 176. A "Thermal delta" for the purposes of this disclosure refers to a change in temperature calculated using two data sets. For example, and without limitation, initial thermal datum 168 may indicate a temperature of 70 degrees and subsequent thermal datum may indicate a temperature of 72 degrees wherein thermal delta 176 may be calculated at positive increase of 2 degrees. In one or more embodiments, thermal delta 176 may indicate a change between initial thermal datum 168 and/or subsequent thermal datum 172. In one or more embodiments, thermal delta 176 may be used to determine how much heat was transferred when automated passageway 132 was opened. In one or more embodiments, or more computing device 104 may receive initial thermal datum 168 and subsequent thermal datum and identify thermal delta 176.

With continued reference to FIG. 1, Computing device 104 may be configured to compare thermal delta 176 to a plurality of historical thermal deltas. A "historical thermal delta" as described in this disclosure refers to a thermal delta 176 received on a previous instance. For example and without limitation, historical thermal delta may include a thermal delta 176 received on a previous day, hour month and/or the like. In one or more embodiments, a plurality of historical thermal delta may be stored on database. In one or more embodiments, each historical thermal delta may include metadata such as timestamps indicating the time of day, temperatures of outside environments and/or any other pertinent information. In one or more embodiments, each historical thermal delta may be associated with a correlated entry command 164 used on that instance. For example, and without limitation, a particular historical delta may be associated with an entry command 164 that indicated for automated passageway 132 to stay open for 5 seconds. In one or more embodiments, computing device 104 may identify thermal delta 176 and associated entry command 164 and compare thermal delta 176 to a plurality of historical thermal deltas correlated to a plurality of historical entry commands. In one or more embodiments, computing device 104 may use such comparison to identify whether entry command 164 resulted in efficient heat preservation. For example, and without limitation, computing device 104 may determine that a particular entry command 164 resulted in increased heat transfer due to automated passageway 132 staying open longer than previous entry commands. In one or more embodiments, computing device 104 may determine based on thermal delta 176 that various entry thresholds 156 may require modification in order to decrease pass through time of industrial device 144, thus decreasing the amount of time an automated passageway 132 needs to stay open and ultimately decreasing thermal delta 176 such that heat loss is minimal.

With continued reference to FIG. 1, computing device 104 may generate a thermal result 180 as a function of a comparison of thermal delta 176 to a plurality of historical thermal deltas. A "thermal result" for the purposes of this disclosure is an analysis of a thermal delta 176 in comparison to a plurality of historical thermal deltas. For example, and without limitation, thermal result 180 may indicate an increase in heat loss in comparison to historical thermal deltas, a decrease in heat loss and/or the like. In one or more embodiments, thermal result 180 may include a comparison of similar historical thermal deltas. For example, and without limitation, computing device 104 may compare thermal delta 176 to historical thermal deltas that occurred at similar time frames, that occurred on similar days of the year, that occurred on days with similar weather patterns and/or the like. In one or more embodiments, thermal result 180 may be sued to indicate if a particular entry command 164 resulted in an ideal thermal delta 176 (wherein an ideal thermal delta 176 may be one closest to 0). In one or more embodiments, thermal result 180 may indicate changes between other historical thermal deltas, such as for example, an increase of 1 degree and/or a decrease of 1 degree in comparison to other historical thermal deltas. In one or more embodiments, computing device 104 may generate averages, standard deviations and/or the lime of similar historical thermal deltas and compare thermal delta 176 to such averages and/or standard deviations. In one or more embodiments, thermal result 180 may include changes in comparison to averages and/or standard deviations.

In one or more embodiments, computing device 104 may use a machine learning model such as a threshold machine learning model 184 to generate and/or modify entry thresholds 156. In one or more embodiments, a threshold machine learning model 184 may be configured to receive thermal deltas and output entry thresholds 156 and/or modifications thereof. In one or more embodiments, an initial set of entry thresholds 156 may be generated by a user, $3^{rd}$ party and/or the like. In one or more embodiments, threshold machine learning model 184 may be configured to output initial set of entry thresholds 156 regardless of spatial data 148, images and/or the like. In one or more embodiments, threshold machine learning model 184 may then be trained using a data set containing a plurality of historical entry thresholds correlated to a plurality of historical thermal deltas. In one or more embodiments, plurality of historical entry thresholds may include entry thresholds 156 used on previous iterations of the processing. In one or more embodiments, threshold machine learning model 184 may be trained to correlate various entry thresholds 156 to various thermal deltas. In one or more embodiments, a particular entry thresholds 156, such as required orientation of a vehicle may be correlated to a particular thermal delta 176. For example, and without limitation, a particular entry threshold 156 requiring a vehicle to be within 10 feet of a passageway may be correlated to a thermal delta 176 of +2 degrees. In one or more embodiments, threshold machine learning model 184 may be configured to minimize a loss function by identifying entry thresholds 156 correlated to thermal deltas closest to 0. In one or more embodiments, threshold machine learning model 184 may generate entry thresholds 156 and populate a database for use in subsequent iterations of the processing. In one or more embodiments, following generation of each entry command 164, computing device 104 may identify thermal delta 176, input thermal delta 176 into threshold machine learning model 184 and receive entry thresholds 156 as a result. In one or more embodiments, threshold machine learning model 184 may provide entry thresholds 156 that may be used to ensure smaller thermal deltas (wherein smaller may be defined as the smaller of an absolute value) in future iterations. In one or more embodiments, threshold machine learning model 184 may be configured to identify entry thresholds 156 that results in larger thermal deltas (wherein larger may refer to the absolutes value) and modify and/to change entry thresholds 156 accordingly. For example, threshold machine learning model 184 may determine that a required spatial orientation of a vehicle may need to change in order to increase pass through time through automated entry system 128 and thus result in smaller thermal deltas. In one or more embodiments, threshold machine learning model 184 may also be used to minimize casualties by identifying orientation that would result in a lower occurrence of an accident and thus a lower occurrence that an automated entry system 128 will need to remain open until the accident is resolved. In one or more embodiments, threshold machine learning model 184 may be iteratively trained following each generation of thermal delta 176. In one or more embodiments, computing device 104 may modify at least one entry threshold 156 of a plurality of entry threshold 156 based on thermal result 180 and/or thermal delta 176. In one or more embodiments, computing device 104 may use thermal result 180 to determine if threshold machine learning model 184 is required to generate and/or modify entry thresholds 156. For example, and without limitation, if thermal result 180 indicate that little change has occurred, then computing device 104 may not instruct threshold hold machine learning model to generate and/or modify entry thresholds 156. In this way, generation and/or modification of entry thresholds 156 may exist only when thermal result 180 indicates that a significant change has occurred in comparison to plurality of historical thermal delta such that generation and/or modification is required. In turn, this may increase efficiency of system 100 and ensure that outputs of entry threshold 156 machine learning model are only modified when needed.

With continued reference to FIG. 1, computing device 104 may be configured to modify entry commands based on thermal delta 176 and/or thermal result 180. In one or more embodiments, computing device 104 may be configured to modify timing parameters of entry commands based on thermal result 180 and/or thermal delta 176 for use in subsequent iterations. In one or more embodiments, system 100 may include a machine learning model such as command machine learning model. In one or more embodiments, command machine learning model may be consistent with any machine learning model as described in this disclosure. In one or more embodiments, command machine learning model may be configured to receive entry result 160 and/or spatial data 148 and output one or more entry commands. In one or more embodiments, command machine learning model may be trained using a plurality of historical spatial data 148 and/or a plurality of historic al entry results correlated to a plurality of entry commands. In one or more embodiments, command machine learning model may be configured to receive an input such as spatial data 148 and/or entry result 160 and output entry command 164. In one or more embodiments, thermal result 180 and/or thermal delta 176 may be used to train command machine learning model, wherein information within thermal result 180 indicated hiring thermal deltas than typical may be used as feedback to command machine learning model was inaccurate. In one or more embodiments, thermal result 180 may be used as feedback in order to self-train command machine learning model. In one or more embodiments, computing device 104 may determine when thermal results contain information indicating a significant change in thermal delta 176 in comparison to historical thermal delta, and in such iterations, use thermal result 180 as feedback to command machine learning model. In one or more embodiments, command machine learning model may be configured to modify existing entry commands located on database. In one or more embodiments, a plurality of entry results and correlated entry commands may be located on database. In one or more embodiments, command machine learning model may be configured to modify at least one entry command 164 in order to minimize thermal delta 176 in subsequent iterations of the processing. In one or more embodiments, modification of entry command 164 may include modification of timing parameter of at least one entry command 164 and/or of automated passageway 132. In one or more embodiments, modification of timing parameter may result in a door opening for shorter or longer periods of time. In one or more embodiments, computing device 104 may be configured to iteratively modify entry commands located on database using command machine learning model in order to minimize heat loss.

With continued reference to FIG. 1, in one more embodiments, system 100 may incorporate and/or include a modular design. In one or more embodiments, system 100 may be designed to be portable or modular, allowing for flexible deployment and retrofitting onto existing entryways without requiring significant structural modifications. The modular design may enables the various components, including the imaging and control hardware, power supply, and mechanical actuation assemblies, to be housed in a compact, self-contained unit or series of interconnectable modules. This facilitates quick installation, repositioning, or removal of the system in a variety of architectural contexts, such as residential, commercial, industrial, or temporary structures. The portability feature also supports use in scenarios requiring rapid setup or reconfiguration, such as events, construction sites, or emergency response settings. System 100 may further include adjustable mounts or brackets, wireless connectivity, and software calibration tools to streamline adaptation to different door configurations, materials, and usage patterns. In one or more embodiments, system 100 may include a range of features and components specifically designed to enhance its modularity and portability. These can include, but are not limited to, a self-contained housing or enclosure that integrates all necessary subsystems into a single unit or a set of easily connectable units. Quick-connect interfaces, such as snap-lock mechanical couplings, plug-and-play electrical connectors, and wireless communication modules (e.g., Wi-Fi, Bluetooth, Zigbee), may be employed to enable rapid assembly, disassembly, and reconfiguration of system components. To accommodate various door types and sizes, system 100 include adjustable mounting brackets, telescoping arms, or sliding rails that allow actuators and motors to be repositioned or scaled. Suction cups, clamps, magnetic mounts, or adhesive pads may be used to temporarily secure system 100 to existing structures without permanent installation. Additionally or alternatively, modular sensor packages, such as motion detectors, RFID readers, or facial recognition cameras, can be optionally added or removed based on use-case requirements.

Figure 2B:
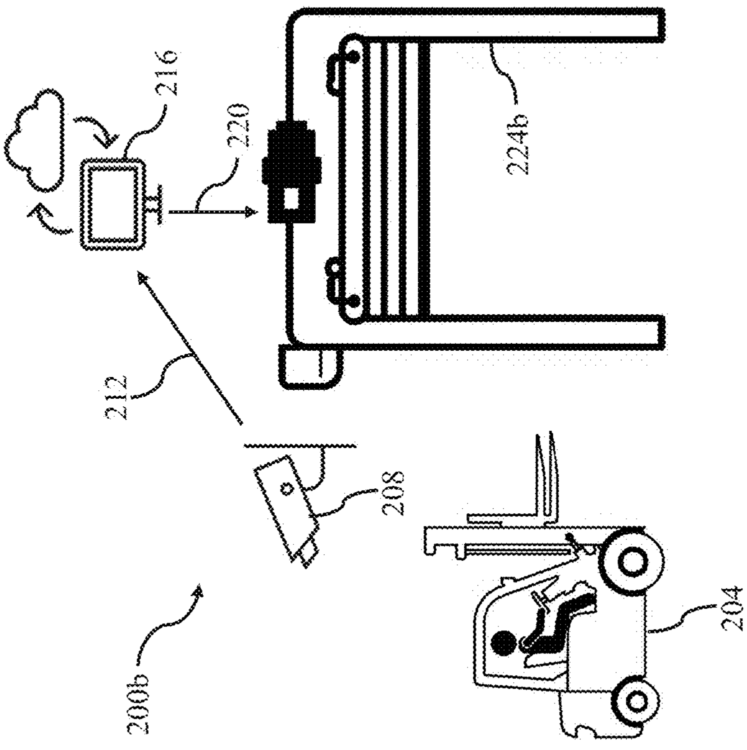
FIG. 2B illustrates an exemplary embodiment of an automated rolling door system in an open configuration.
Figure 2A:
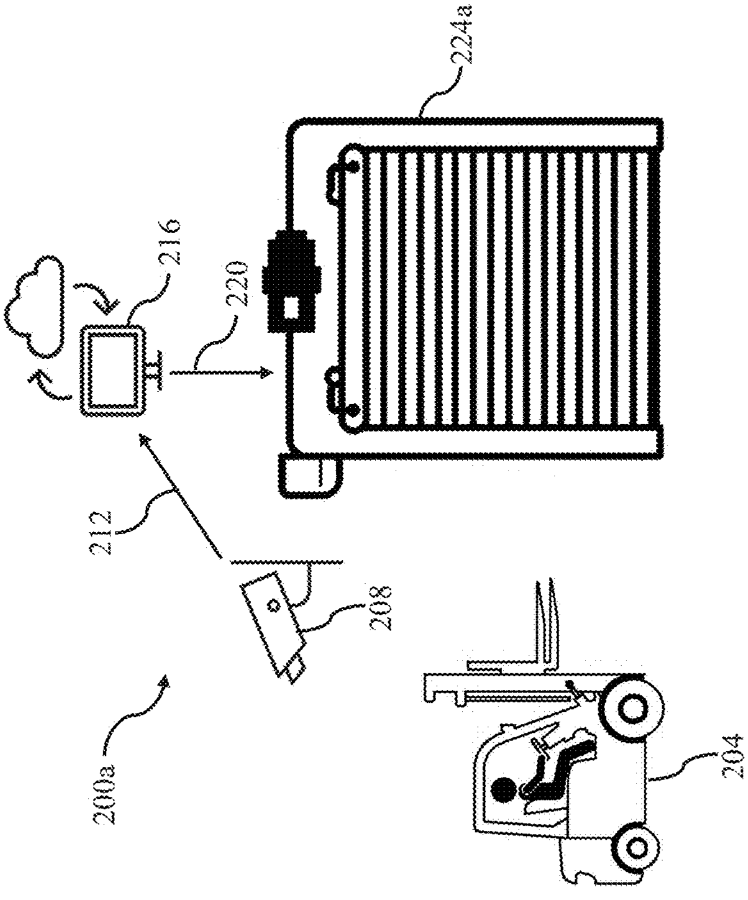
FIG. 2A illustrates an exemplary embodiment of an automated rolling door system in a closed configuration.

Referring now to FIG. 2A, an exemplary embodiment of an automated rolling door system 200*a* in a closed configuration is described. In one or more embodiments, an industrial device 204 may be situated at or near a closed automated entry system 224*a*. In one or more embodiments, a machine vision system 208 may be configured to capture images 212 of industrial device and transmit images 212 to a controller 216. In one or more embodiments, images may include images of a surrounding environment, such for example, industrial device 204, an individual operating industrial device and/or the like. In one or more embodiments, images 212 may include any images as described in this disclosure. In one or more embodiments, controller 216 may receive images 212 and perform one or more processes and/or one or more image classification processes to images 212. In one or more embodiments, controller 216 may be consistent with a computing device as described in FIG. 1. In one or more embodiments, controller may include a network sever wherein images 212 may be received wirelessly from machine vision system 208. In one or more embodiments, controller may be configured to generate entry commands 220 and transmit entry commands to an automated entry system such as closed automated entry system 224*a*. In one or more embodiments, closed automated entry system 224*a* may include an automated entry system in in which an automated passageway is restricted. In one or more embodiments, closed automated entry system 224*a* may be in a configuration in which a door is rolled down such that entry to a facility and/or another location is in accessible. In one or more embodiments, controller 216 may transmit entry command 220 to closed automated entry system 224*a* in order to allow for access through an automated passageway. In one or more embodiments, entry commands may include actuation of motors mechanically connected to automated passageway such that a door is opened, unlocked and/or the like.

Referring now to FIG. 2B, an exemplary embodiment of an automated rolling door system 200*b* in an open configuration is described. In one or more embodiments, upon receipt of entry command 220 from controller 216, automated entry system may open and allow for industrial device 204 to pass through. In one or more embodiments, automated entry system may now be an open automated entry system 224*b*, wherein automated entry system allows for industrial device to pass through. In one or more embodiments, upon traversal of industrial device through open automated entry system, controller 216 may signify to automated entry system to close any doors, actuate any motors and/or the like.

Figure 3:
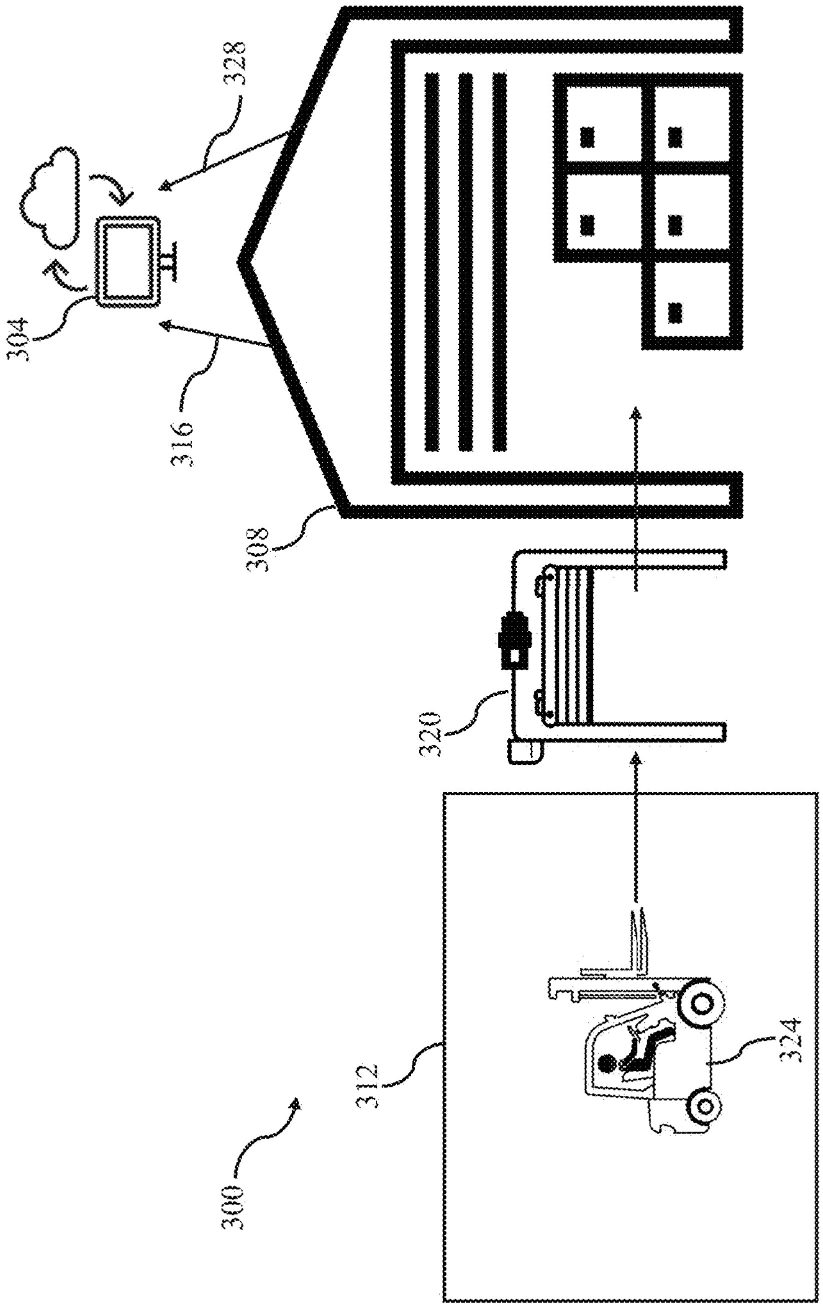
FIG. 3 illustrates an exemplary embodiment of a thermal recordation system.

Referring now to FIG. 3, an exemplary embodiment of a thermal recordation system 300 is described. In one or more embodiments, thermal recordation system 300 may be utilized to capture and/or record thermal datum, initial thermal datum, subsequent thermal datum and/or the like as described in reference to at least FIG. 1. In one or more embodiments, controller 304 may be communicatively connected to one or more thermal sensors within a facility 308. In one or more embodiments, facility 308 may include a factory, a warehouse and/or any other enclosed area that is partially and/or wholly insulated from an outside environment 312. In one or more embodiments, automated entry system 320 may allow for access into and/or out of facility 308. In one or more embodiments, automated entry system 320 may provide access for industrial device 324 to or from external environment 312 and into or out of facility 308. In one or more embodiments, controller 304 may be configured to receive initial thermal datum 316 prior to an opening of automated entry system 320. In one or more embodiments, controller may be configured to capture a temperature of a facility 308 prior to transmission of entry command. In one or more embodiments, automated entry system 320 may then allow for industrial device enter from an external environment 312 and through automated entry system 320 and into facility 308. In one or more embodiments, automated entry system may allow for access through automated passageway wherein, once industrial device has entered facility 308, automated entry system 320 may close automated passageway such that ambient air from external environment 312 can no longer pass through. In one or more embodiments, upon closure of automated passageway, controller 304 may be configured to receive subsequent thermal datum 328. In one or more embodiments, subsequent thermal datum may include temperature of facility 308 and/or temperature of a point near automated entry system 320. In one or more embodiments, initial thermal datum 316 and subsequent thermal datum 328 may be used to generate thermal delta and/or thermal result as described in reference to at least FIG. 1. In one or more embodiments, controller 304 may be configured to modify entry commands as a result in order to minimize heat transfer between outside environment 312 and facility 308.

Figure 4:
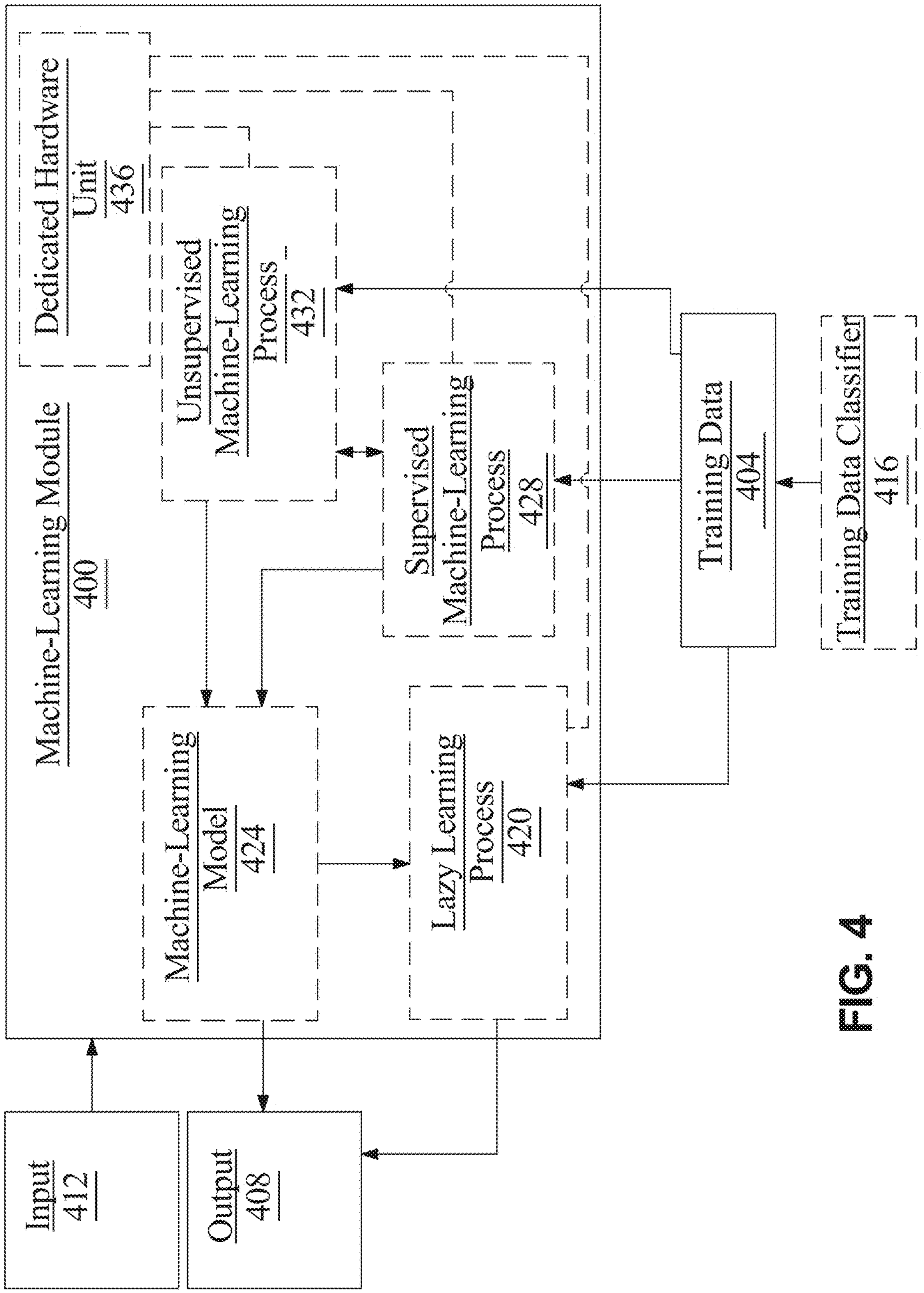
FIG. 4 is a block diagram of exemplary embodiment of a machine learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs may include inputs such as initial images, spatial data, thermal results and/or the like.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to classes of industrial vehicles, classes of entry commands and/or the like.

Still referring to FIG. 4, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)$ $P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculating the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 4]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively, or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data analyzed are represented by more training examples than values that are encountered less frequently. Alternatively, or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively, or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators to take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively, or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean upside-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described above as inputs, outputs as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including, without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively, or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any current or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
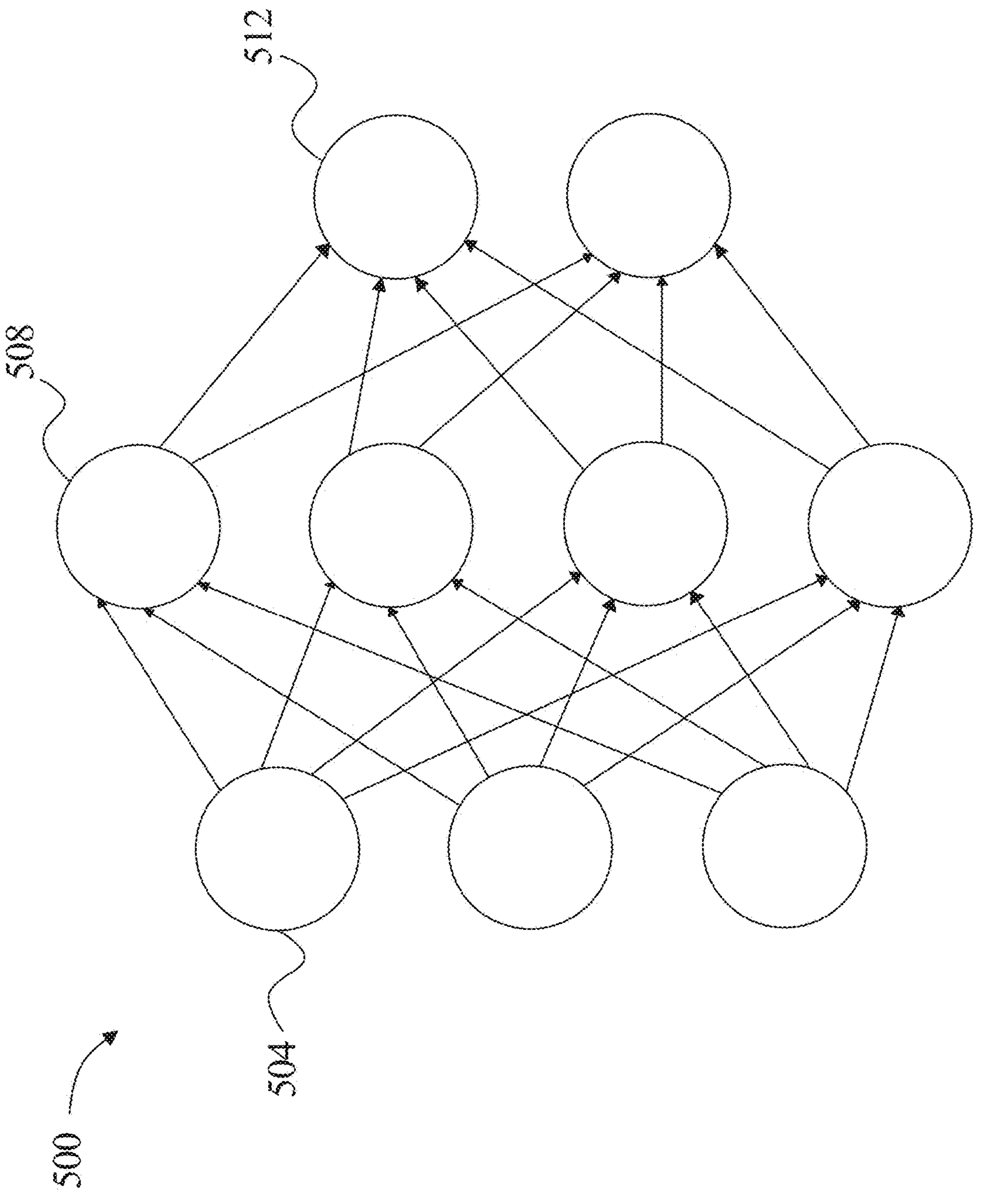
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
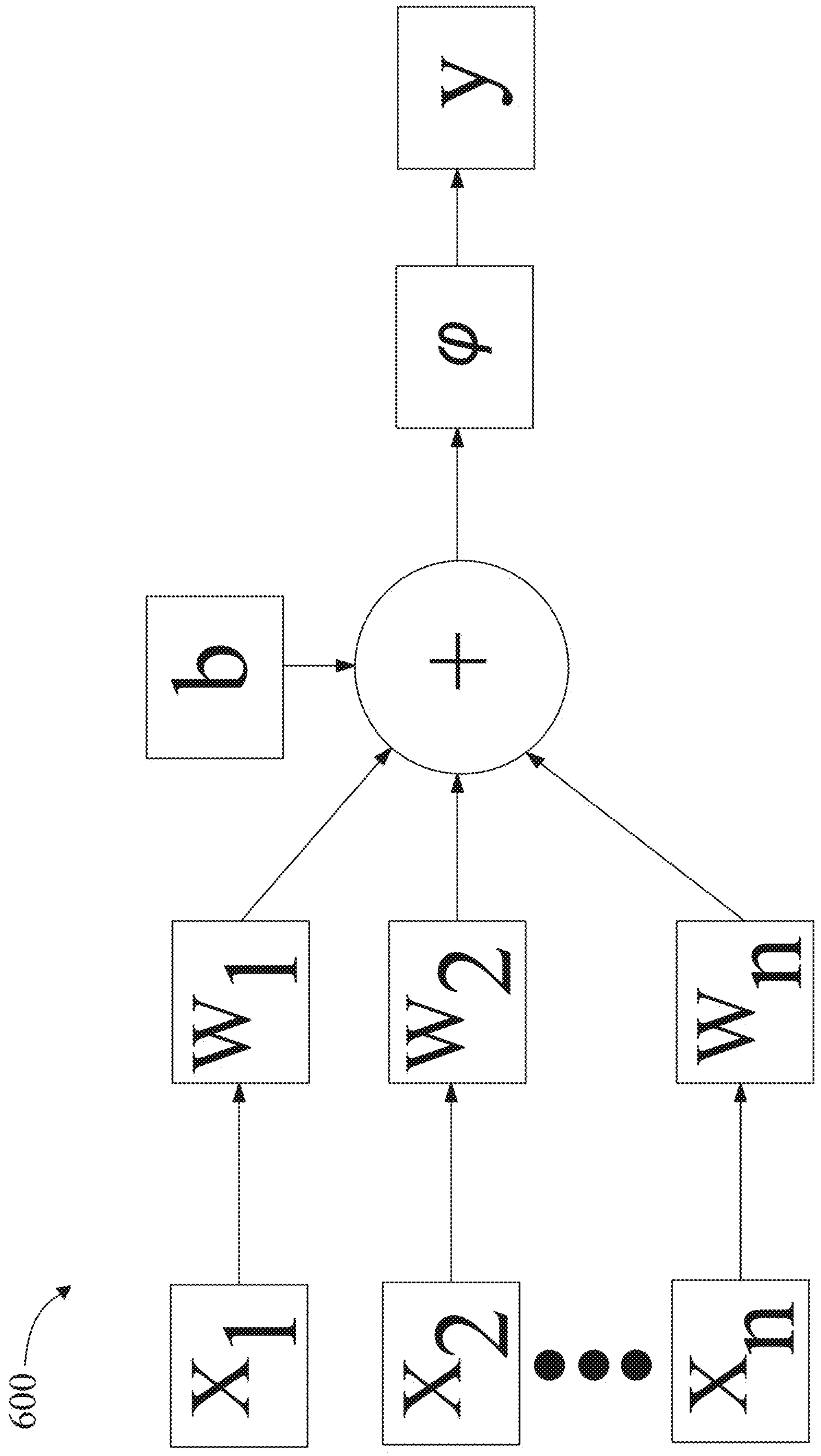
FIG. 6 is a block diagram of an exemplary embodiment of a node of a neural network.

Referring now to FIG. 6, an exemplary embodiment of a node 600 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights w; that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
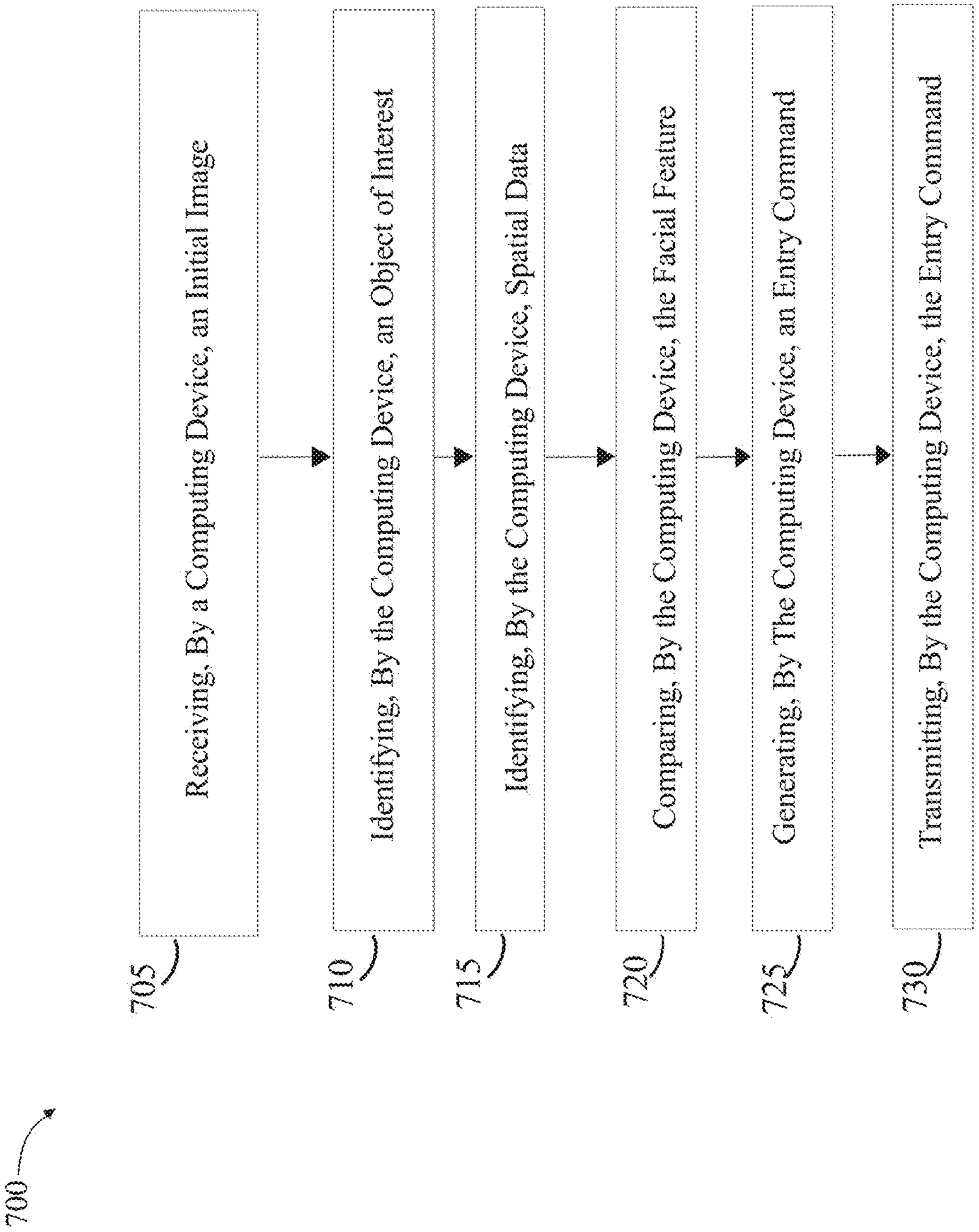
FIG. 7 is a flow diagram illustrating an exemplary embodiment of a method of use for an automated rolling door system.

Referring now to FIG. 7, an exemplary method 700 for an automated rolling door system is described. At step 705, method 700 includes receiving, by a computing device, an initial image from a machine vision system, wherein the machine vision system includes a camera configured to capture one or more images. This may be implemented with reference to FIGS. 1-6.

With continued reference to FIG. 7, at step 710 method 700 includes identifying, by the computing device, an object of interest and a facial feature associated with the object of interest within the initial image, wherein the object of interest includes at least an industrial device. This may be implemented with reference to FIGS. 1-6.

With continued reference to FIG. 7, at step 715 method 700 includes identifying, by the computing device, spatial data of the object of interest. This may be implemented with reference to FIGS. 1-6.

With continued reference to FIG. 7, at step 720 method 700 includes comparing, by the computing device, the facial feature and the spatial data to a plurality of entry thresholds to generate an entry result. This may be implemented with reference to FIGS. 1-6.

With continued reference to FIG. 7, at step 725 method 700 includes generating, by the computing device, an entry command as a function of the entry result. This may be implemented with reference to FIGS. 1-6.

With continued reference to FIG. 7, at step 730 method 700 includes transmitting, by the computing device, the entry command to an automated entry system, wherein the automated entry system is configured to receive the entry command and initiate an entry response as a function of the entry command. This may be implemented with reference to FIGS. 1-6.

With continued reference to FIG. 7, in one or more embodiments, identifying spatial data of the industrial device includes identifying an orientation of the industrial device relative to the automated entry system. In one or more embodiments, the industrial device includes a motorized industrial vehicle. In one or more embodiments, comparing the facial feature and the spatial data to the plurality of entry thresholds includes comparing the facial feature to a plurality of authorized facial features located on a database to produce a facial result and identifying a biometric match as a function of the facial result. In one or more embodiments, the plurality of entry thresholds include one or more authorized unique identifiers. In one or more embodiments, comparing the facial feature and the spatial data to the plurality of entry thresholds includes identifying a unique identifier on the industrial device and comparing the unique identifier to the one or more authorized unique identifiers. In one or more embodiments, the entry response includes actuation of an automated passageway. In one or more embodiments, the spatial data includes a distance of the industrial device relative to the automated entry system. In one or more embodiments, transmitting the entry command to an automated entry system as a function of the entry result further includes appending to a central log as a function of the spatial data and the facial feature, wherein the central log is located on a remote database. In one or more embodiments, generating the plurality of entry thresholds includes receiving an initial thermal datum of a surrounding environment of the industrial device prior to generation of the entry command, receiving a subsequent thermal datum of the surrounding environment following generation of the entry command, identifying a thermal delta between the initial thermal datum and the subsequent thermal datum, comparing the thermal delta to a plurality of historical thermal deltas to generate a thermal result and modifying at least one entry threshold of the plurality of entry thresholds as a function of the thermal result. In one or more embodiments, method 700 further includes modifying, by the computing device, at least one entry command of a plurality of entry commands stored on a central database and wherein modification of the at least one entry command includes modification of a timing parameter of an automated passageway. This may be implemented with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
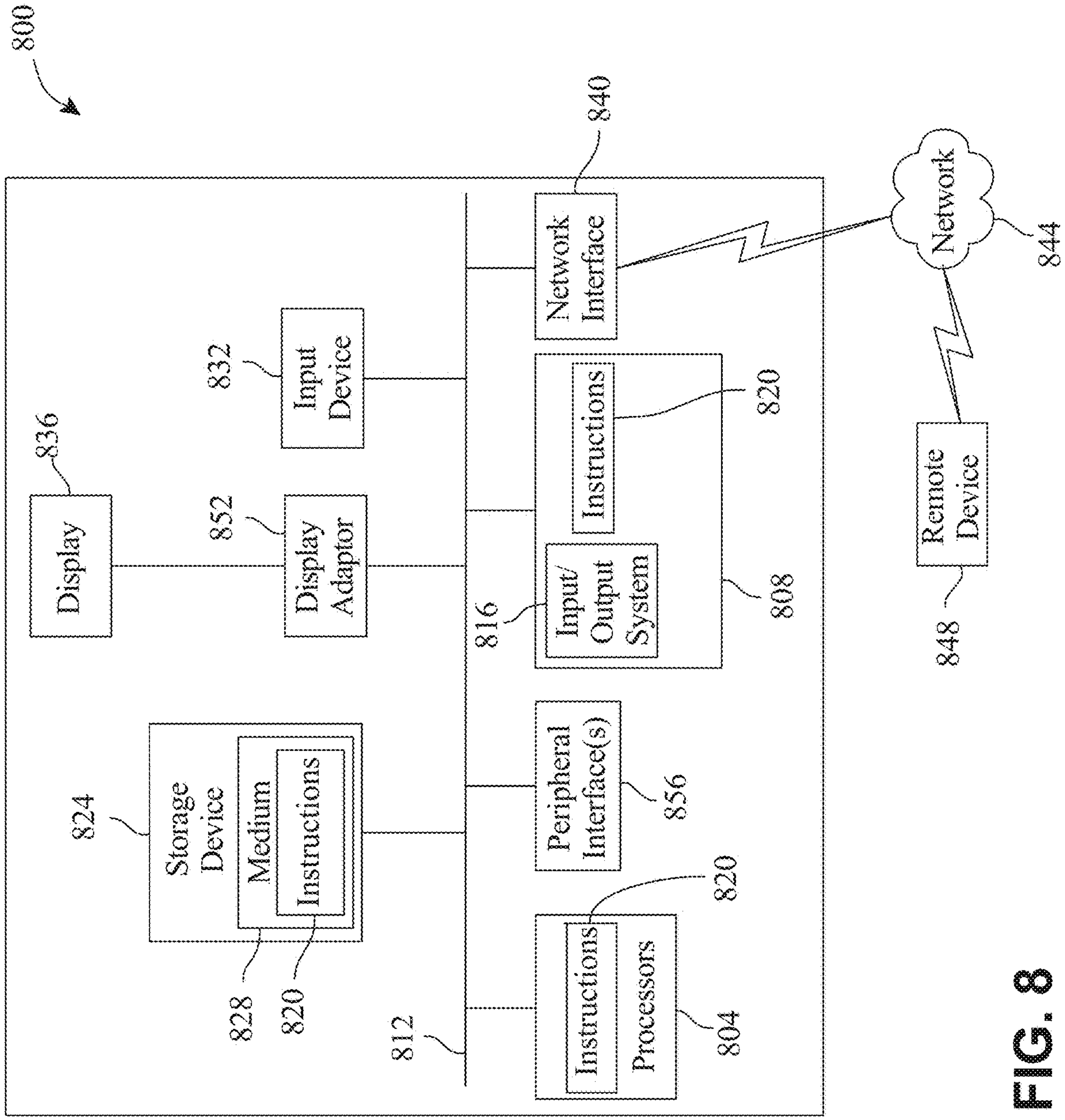
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display 836. Examples of a display device include, but are not limited to, a liquid crystal display (LCD), a cathode ray tube (CRT), a plasma display, a light emitting diode (LED) display, and any combinations thereof. Display adapter 852 and display 836 may be utilized in combination with processor 804 to provide graphical representations of aspects of the present disclosure. In addition to a display device, computer system 800 may include one or more other peripheral output devices 856 including, but not limited to, an audio speaker, a printer, and any combinations thereof. Such peripheral output devices 856 may be connected limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An automated rolling door system, comprising:
- a machine vision system comprising a camera, wherein the camera is configured to capture one or more images;
- a computing device configured to:
  - receive an initial image from the camera;
  - identify an object of interest and a facial feature associated with the object of interest within the initial image, wherein the object of interest comprises at least an industrial device;
  - identify spatial data of the object of interest;
  - generate a plurality of entry thresholds by:
    - receiving an initial thermal datum of a surrounding environment of the industrial device prior to generation of an entry command;
    - receiving a subsequent thermal datum of the surrounding environment following generation of the entry command;
    - identifying a thermal delta between the initial thermal datum and the subsequent thermal datum;
    - comparing the thermal delta to a plurality of historical thermal deltas to generate a thermal result; and
    - modifying at least one entry threshold of the plurality of entry thresholds as a function of the thermal result;
  - compare the facial feature and the spatial data to the plurality of entry thresholds to generate an entry result;
  - generate a modified entry command as a function of the entry result; and
  - transmit the modified entry command to an automated entry system; and
- the automated entry system, wherein the automated entry system is configured to:
  - receive the modified entry command; and
  - initiate an entry response as a function of the modified entry command.

2. The automated rolling door system of claim 1, wherein identifying spatial data of the industrial device comprises identifying an orientation of the industrial device relative to the automated entry system.

3. The automated rolling door system of claim 1, wherein the industrial device comprises a motorized industrial vehicle.

4. The automated rolling door system of claim 1, wherein comparing the facial feature and the spatial data to the plurality of entry thresholds comprises:
- comparing the facial feature to a plurality of authorized facial features located on a database to produce a facial result; and
- identifying a biometric match as a function of the facial result.

5. The automated rolling door system of claim 1, wherein:
- the plurality of entry thresholds comprise one or more authorized unique identifiers; and
- comparing the facial feature and the spatial data to the plurality of entry thresholds comprises:
  - identifying a unique identifier on the industrial device; and
  - comparing the unique identifier to the one or more authorized unique identifiers.

6. The automated rolling door system of claim 1, wherein the entry response comprises actuation of an automated passageway.

7. The automated rolling door system of claim 1, wherein the spatial data comprises a distance of the industrial device relative to the automated entry system.

8. The automated rolling door system of claim 1, wherein transmitting the entry command to the automated entry system as the function of the entry result further comprises appending to a central log as a function of the spatial data and the facial feature, wherein the central log is located on a remote database.

9. The automated rolling door system of claim 1, wherein the computing device is further configured to modify at least one entry command of a plurality of entry commands stored on a central database and wherein modification of the at least one entry command comprises modification of a timing parameter of an automated passageway.

10. A method of use for an automated rolling door system, the method comprising:

receiving, by a computing device, an initial image from a machine vision system, wherein the machine vision system comprises a camera configured to capture one or more images;

identifying, by the computing device, an object of interest and a facial feature associated with the object of interest within the initial image, wherein the object of interest comprises at least an industrial device;

identifying, by the computing device, spatial data of the object of interest;

generating, by the computing device, a plurality of entry thresholds by:

receiving an initial thermal datum of a surrounding environment of the industrial device prior to generation of an entry command;

receiving a subsequent thermal datum of the surrounding environment following generation of the entry command;

identifying a thermal delta between the initial thermal datum and the subsequent thermal datum;

comparing the thermal delta to a plurality of historical thermal deltas to generate a thermal result; and modifying at least one entry threshold of the plurality of entry thresholds as a function of the thermal result;

comparing, by the computing device, the facial feature and the spatial data to a plurality of entry thresholds to generate an entry result;

generating, by the computing device, a modified entry command as a function of the entry result; and transmitting, by the computing device, the modified entry command to an automated entry system, wherein the automated entry system is configured to:

receive the modified entry command; and initiate an entry response as a function of the modified entry command.

11. The method of claim 10, wherein identifying spatial data of the industrial device comprises identifying an orientation of the industrial device relative to the automated entry system.

12. The method of claim 10, wherein the industrial device comprises a motorized industrial vehicle.

13. The method of claim 10, wherein comparing the facial feature and the spatial data to the plurality of entry thresholds comprises:

comparing the facial feature to a plurality of authorized facial features located on a database to produce a facial result; and identifying a biometric match as a function of the facial result.

14. The method of claim 10, wherein:

the plurality of entry thresholds comprise one or more authorized unique identifiers; and comparing the facial feature and the spatial data to the plurality of entry thresholds comprises:

identifying a unique identifier on the industrial device; and comparing the unique identifier to the one or more authorized unique identifiers.

15. The method of claim 10, wherein the entry response comprises actuation of an automated passageway.

16. The method of claim 10, wherein the spatial data comprises a distance of the industrial device relative to the automated entry system.

17. The method of claim 10, wherein transmitting the entry command to the automated entry system as the function of the entry result further comprises appending to a central log as a function of the spatial data and the facial feature, wherein the central log is located on a remote database.

18. The method of claim 10, the method further comprising, modifying, by the computing device, at least one entry command of a plurality of entry commands stored on a central database and wherein modification of the at least one entry command comprises modification of a timing parameter of an automated passageway.

* * * * *